(12) United States Patent
Juzumas et al.

(10) Patent No.: US 12,233,474 B2
(45) Date of Patent: Feb. 25, 2025

(54) METHODS FOR LASER PROCESSING TRANSPARENT WORKPIECES USING MODIFIED PULSE BURST PROFILES

(71) Applicant: CORNING INCORPORATED, Corning, NY (US)

(72) Inventors: Valdemaras Juzumas, Vilnius (LT); Reinhard Moritz Malchus, Munich (DE); Sasha Marjanovic, Painted Post, NY (US); Garrett Andrew Piech, Corning, NY (US); Vytautas Sabonis, Giluziu k. Avizieniu sen Vilniaus raj (LT); Ralf Joachim Terbrueggen, Neuried (DE)

(73) Assignee: CORNING INCORPORATED, Corning, NY (US)

( * ) Notice: Subject to any disclaimer, the term of this patent is extended or adjusted under 35 U.S.C. 154(b) by 253 days.

(21) Appl. No.: 17/329,578

(22) Filed: May 25, 2021

(65) Prior Publication Data
US 2021/0379695 A1 Dec. 9, 2021

Related U.S. Application Data

(60) Provisional application No. 63/034,701, filed on Jun. 4, 2020.

(51) Int. Cl.
*B23K 26/0622* (2014.01)
*B23K 26/06* (2014.01)
(Continued)

(52) U.S. Cl.
CPC ...... *B23K 26/0622* (2015.10); *B23K 26/0648* (2013.01); *B23K 26/18* (2013.01); *B23K 26/53* (2015.10); *B23K 2103/54* (2018.08)

(58) Field of Classification Search
CPC ............... B23K 26/53; B23K 2103/54; B23K 26/0624; B23K 26/0006; B23K 26/0648;
(Continued)

(56) References Cited

U.S. PATENT DOCUMENTS

| | | | |
|---|---|---|---|
| 6,552,301 B2 | 4/2003 | Herman et al. | |
| 10,611,667 B2 | 4/2020 | Bookbinder et al. | |

(Continued)

FOREIGN PATENT DOCUMENTS

| | | | | |
|---|---|---|---|---|
| LT | 2015085 A | | 4/2017 | |
| WO | WO-2014111385 A1 | * | 7/2014 | ......... B23K 26/0006 |

(Continued)

OTHER PUBLICATIONS

Meyer et al., "Stealth dicing with ultrafast Bessel beams with engineered transverse profiles", CLEO 2017, 3 pages.

(Continued)

*Primary Examiner* — Phuong T Nguyen
(74) *Attorney, Agent, or Firm* — LEWIS ROCA ROTHGERBER CHRISTIE LLP

(57) ABSTRACT

A method of laser processing a transparent workpiece includes directing a pulsed laser beam into the transparent workpiece. The pulsed laser beam includes pulse bursts having 2 sub-pulses per pulse burst or more, each pulse burst of the pulsed laser beam has a burst duration $T_{bd}$ of 380 ns or greater; and the pulsed laser beam forms a pulsed laser beam focal line in the transparent workpiece, the pulsed laser beam focal line inducing absorption in the transparent workpiece, the induced absorption producing a defect in the transparent workpiece. The pulsed laser beam focal line includes a wavelength $\lambda$, a spot size $w_o$, and a Rayleigh range $Z_R$ that is greater than (Continued)

$$F_D \frac{\pi w_o^2}{\lambda},$$

where $F_D$ is a dimensionless divergence factor comprising a value of 10 or greater.

11 Claims, 18 Drawing Sheets

(51) Int. Cl.
  *B23K 26/18* (2006.01)
  *B23K 26/53* (2014.01)
  *B23K 103/00* (2006.01)
(58) Field of Classification Search
  CPC ............ B23K 2103/56; B23K 26/0738; B23K 2103/52; B23K 26/364; B23K 26/38; B23K 2103/50; B23K 26/082; B23K 2101/40; B23K 2103/42; B23K 26/0626; B23K 26/08; B23K 26/359; B23K 2103/00; B23K 26/0608; B23K 26/0617; B23K 26/0622; B23K 26/064; B23K 26/066; B23K 26/0734; B23K 26/18; B23K 26/352; B23K 26/40; B23K 26/55; B23K 2101/42; B23K 2103/16; B23K 2103/166; B23K 26/009; B23K 26/032; B23K 26/0604; B23K 26/0613; B23K 26/0643; B23K 26/0652; B23K 26/0665; B23K 26/067; B23K 26/0676; B23K 26/073; B23K 26/0736; B23K 26/0876; B23K 26/103; B23K 26/122; B23K 26/362; B23K 26/388; B23K 26/402; H01L 21/78; H01L 21/268; H01L 29/32; C03C 23/0025; C03C 15/00; C03C 14/002; C03C 2214/02; C03C 19/00; C03C 21/002; C03C 3/093; C03B 33/0222; C03B 33/04; C03B 33/091; C03B 33/033; C03B 33/07; C03B 33/09; C03B 33/102; C03B 33/0215; C03B 33/037; C03B 33/072; C03B 33/076; C03B 33/078
  See application file for complete search history.

(56) References Cited

U.S. PATENT DOCUMENTS

| | | | |
|---|---|---|---|
| 10,730,783 | B2 | 8/2020 | Akarapu et al. |
| 11,028,003 | B2 | 6/2021 | Grundmueller et al. |
| 11,059,131 | B2 | 7/2021 | Piech et al. |
| 2012/0255935 | A1* | 10/2012 | Kakui ............... B23K 26/40 219/121.6 |
| 2014/0199519 | A1 | 7/2014 | Schillinger et al. |
| 2015/0034613 | A1* | 2/2015 | Hosseini ............ B23K 26/53 219/121.61 |
| 2016/0016257 | A1* | 1/2016 | Hosseini .......... B23K 26/0006 65/355 |
| 2017/0120374 | A1* | 5/2017 | Hendricks ......... B23K 26/0624 |
| 2018/0057390 | A1* | 3/2018 | Hackert ................ C03C 3/093 |
| 2018/0093914 | A1 | 4/2018 | Akarapu et al. |
| 2019/0047894 | A1* | 2/2019 | Heiss ............... B23K 26/0608 |
| 2019/0062196 | A1* | 2/2019 | Bui ..................... B23K 26/53 |
| 2019/0119150 | A1* | 4/2019 | Burket ............. C03C 23/0025 |
| 2019/0144325 | A1* | 5/2019 | Bowden ............. B23K 26/53 219/121.69 |
| 2019/0263709 | A1* | 8/2019 | Becker ............... B23K 26/53 |
| 2019/0300417 | A1* | 10/2019 | Stute .................. B23K 26/18 |
| 2019/0300418 | A1* | 10/2019 | Rosier ................ B23K 26/009 |
| 2019/0352215 | A1 | 11/2019 | Grundmueller et al. |
| 2020/0254567 | A1* | 8/2020 | Genier ............... B23K 26/066 |
| 2020/0283325 | A1* | 9/2020 | Levi .................... C03C 15/00 |
| 2020/0331793 | A1 | 10/2020 | Akarapu et al. |
| 2021/0371327 | A1* | 12/2021 | Suzuki ................. B24B 1/00 |

FOREIGN PATENT DOCUMENTS

| | | | | |
|---|---|---|---|---|
| WO | WO-2015095088 | A1 * | 6/2015 | ........ B23K 26/0622 |
| WO | 2016/154284 | A1 | 9/2016 | |

OTHER PUBLICATIONS

Meyer et al., "Submicron-quality cleaving of glass with elliptical ultrafst Bessel beams", Apply Phys. Lett., vol. 111, 231108, 2017, 6 pages.

Mischik et al., "Improved laser glass cutting by spatio-temporal control of energy deposition using burst of femtosecond pulses", OPt. Experfess vol. 25 No. 26, Dec. 2017, pp. 33271-33282.

International Search Report and Written Opinion of the International Searching Authority; PCT/US2021/034014; dated Oct. 14, 2021; 11 pages; European Patent Office.

* cited by examiner

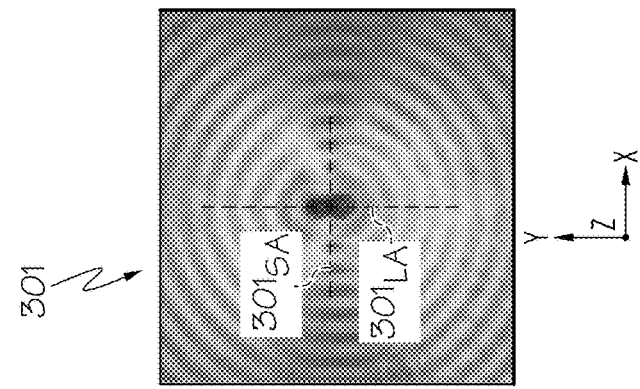
FIG. 11A4
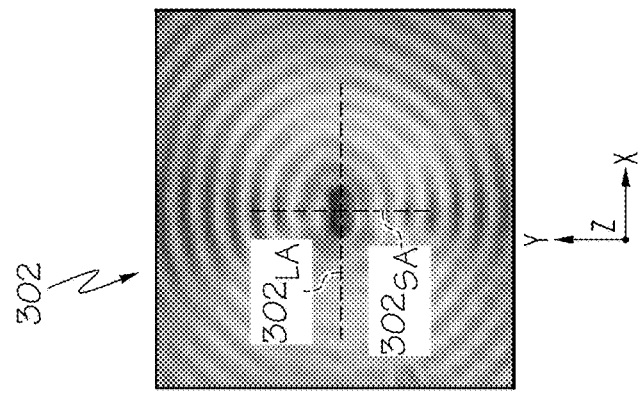
FIG. 11A3
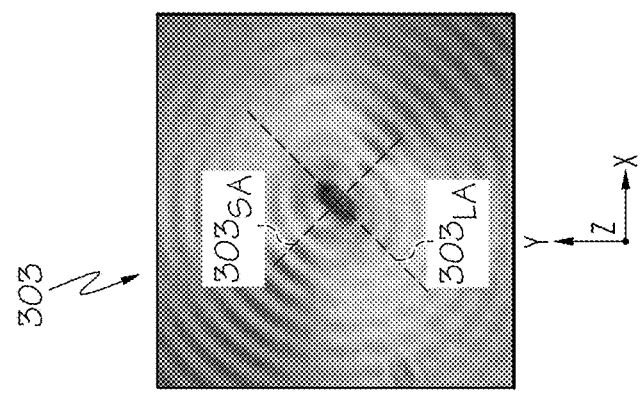
FIG. 11A2
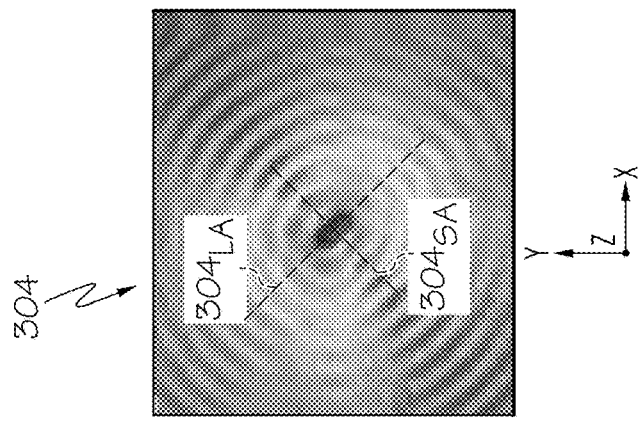
FIG. 11A1

METHODS FOR LASER PROCESSING TRANSPARENT WORKPIECES USING MODIFIED PULSE BURST PROFILES

This application claims priority under 35 USC § 119(e) from U.S. Provisional Patent Application Ser. No. 63/034,701 filed on Jun. 4, 2020 which is incorporated by reference herein in its entirety.

BACKGROUND

Field

The present specification generally relates to apparatuses and methods for laser processing brittle substrates, such as glass substrates and glass-ceramic substrates using a pulsed laser beam.

Technical Background

The area of laser processing of materials encompasses a wide variety of applications that involve cutting, drilling, milling, welding, melting, etc. of different types of materials. Among these processes, one that is of particular interest is cutting or separating transparent substrates in a process that may be utilized in the production of glass or other transparent materials for a variety of applications, including vehicle glass such as vehicle windows and windshields.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to first aspect of the present disclosure a method of laser processing a transparent workpiece includes directing a pulsed laser beam into the transparent workpiece. The pulsed laser beam includes pulse bursts having 2 sub-pulses per pulse burst or more, each pulse burst of the pulsed laser beam has a burst duration $T_{bd}$ of 380 ns or greater; and the pulsed laser beam forms a pulsed laser beam focal line in the transparent workpiece, the pulsed laser beam focal line inducing absorption in the transparent workpiece, the induced absorption producing a defect in the transparent workpiece. The pulsed laser beam focal line includes a wavelength $\lambda$, a spot size $w_o$, and a Rayleigh range $Z_R$ that is greater than $$F_D \frac{\pi w_o^2}{\lambda},$$

where $F_D$ is a dimensionless divergence factor comprising a value of 10 or greater.

A second aspect of the present disclosure includes the method of the first aspect, wherein each pulse burst of the pulsed laser beam has a burst duration $T_{bd}$ of 400 ns or greater.

A third aspect of the present disclosure includes the method of the first aspect or the second aspect, wherein each pulse burst of the pulsed laser beam has a sub-pulse period $T_p$ of 25 ns or greater.

A fourth aspect of the present disclosure includes the method of any of the previous aspects, wherein each pulse burst of the pulsed laser beam has a sub-pulse period $T_p$ of 50 ns or greater.

A fifth aspect of the present disclosure includes the method of any of the previous aspects, wherein each pulse burst of the pulsed laser beam has a burst duration $T_{bd}$ of 400 ns or greater and a sub-pulse period $T_p$ is 50 ns or greater.

A sixth aspect of the present disclosure includes the method of any of the previous aspects, wherein the method produces a plurality of the defects and a spacing between adjacent defects of the plurality of the defects is 35 µm or less.

A seventh aspect of the present disclosure includes the method of any of the previous aspects, wherein the method produces a plurality of the defects and a spacing between adjacent defects of the plurality of the defects is from 10 µm to 30 µm.

An eighth aspect of the present disclosure includes the method of any of the previous aspects, wherein each pulse burst of the pulsed laser beam has from 2 sub-pulses to 5 sub-pulses.

A ninth aspect of the present disclosure includes the method of any of the previous aspects, wherein each pulse burst of the pulsed laser beam has a pulse burst energy of greater than 100 µJ.

A tenth aspect of the present disclosure includes the method of any of the previous aspects, wherein each pulse burst of the pulsed laser beam has a pulse burst energy of greater than 500 µJ.

An eleventh aspect of the present disclosure includes the method of any of the previous aspects, wherein an energy of each sub-pulse of the pulse burst differs from the energy of other sub-pulses of the pulse burst by 10% or less.

A twelfth aspect of the present disclosure includes the method of any of the previous aspects, wherein the energy of each sub-pulse of the pulse burst differs from the energy of the other sub-pulses by 5% or less.

A thirteenth aspect of the present disclosure includes the method of any of the previous aspects, wherein the energy of each sub-pulse of the pulse burst differs from the energy of the other sub-pulses by 1% or less.

A fourteenth aspect of the present disclosure includes the method of any of the previous aspects, further including translating at least one of the transparent workpiece and the pulsed laser beam relative to each other along a contour line to form a contour having a plurality of the defects in the transparent workpiece, wherein the contour is linear.

A fifteenth aspect of the present disclosure includes the method of the fourteenth aspect, wherein the contour has a break resistance of 20 MPa or less when measured with either a laser incidence side in tension (LIT) or a laser incidence side in compression (LIC).

A sixteenth aspect of the present disclosure includes the method of the fourteenth aspect or the fifteenth aspect, wherein the contour has a break resistance of 10 MPa or less when measured with either the LIT or the LIC.

A seventeenth aspect of the present disclosure includes the method of any of the fourteenth through sixteenth aspects, wherein the contour has a break resistance of 5 MPa or less when measured with either the LIT or the LIC.

An eighteenth aspect of the present disclosure includes the method of any of the fourteenth through seventeenth aspects, wherein a break resistance of the contour is a directionally homogenous break resistance.

A nineteenth aspect of the present disclosure includes the method of any of the fourteenth through eighteenth aspects, further including applying a stress to the contour to separate the transparent workpiece along the contour.

A twentieth aspect of the present disclosure includes the method of the nineteenth aspect, wherein the stress is a thermal stress, a mechanical stress, or a combination thereof.

A twenty-first aspect of the present disclosure includes the method of any of the previous aspects, wherein the pulsed laser beam traverses an aspheric optical element before irradiating the transparent workpiece.

A twenty-second aspect of the present disclosure includes the method of the twenty-first aspect, wherein the aspheric optical element includes a refractive axicon, a reflective axicon, negative axicon, a diffractive optic, or a cubically shaped optical element.

A twenty-third aspect of the present disclosure includes the method of any of the previous aspects, wherein the dimensionless divergence factor $F_D$ is a value of from about 10 to about 2000.

A twenty-fourth aspect of the present disclosure includes the method of any of the previous aspects, wherein the transparent workpiece includes borosilicate glass, soda-lime glass, aluminosilicate glass, alkali aluminosilicate glass, alkaline earth aluminosilicate glass, alkaline earth boroaluminosilicate glass, fused silica, sapphire, silicon, or gallium arsenide.

A twenty-fifth aspect of the present disclosure includes the method of any of the previous aspects, wherein a cross section of the pulsed laser beam focal line is a non-axisymmetric cross-sectional shape such that the defect comprises a non-axisymmetric cross-sectional shape.

A twenty-sixth aspect of the present disclosure includes the method of any of the previous aspects, wherein the pulsed laser beam traverses a nonlinear optical crystal positioned upstream the transparent workpiece, the nonlinear optical crystal converting the wavelength $\lambda$ into a harmonic of the wavelength $\lambda$, the pulsed laser beam focal line formed from the harmonic of the wavelength $\lambda$.

A twenty-seventh aspect of the present disclosure includes the method of the twenty-sixth aspect, wherein the sub-pulses have the harmonic of the wavelength $\lambda$ and an energy of each sub-pulse of the pulse burst differs from the energy of other sub-pulses of the pulse burst by 10% or less.

A twenty-eighth aspect of the present disclosure includes the method of any of the previous aspects, wherein the transparent workpiece has combined losses due to linear absorption and scattering less than 20%/mm in a beam propagation direction at the wavelength $\lambda$.

A twenty-ninth aspect of the present disclosure includes the method of any of the previous aspects, wherein the wavelength $\lambda$ of the pulsed laser beam is less than 600 nm.

A thirtieth aspect of the present disclosure includes the method of the twenty-ninth aspect, wherein the wavelength $\lambda$ of the pulsed laser beam is one of 532 nm, 515 nm, 355 nm, and 343 nm.

A thirty-first aspect of the present disclosure includes the method of the thirtieth aspect, wherein each pulse burst of the pulsed laser beam has from 2 sub-pulses to 4 sub-pulses.

According to thirty-second aspect of the present disclosure a method of laser processing a transparent workpiece includes directing a pulsed laser beam oriented along a beam pathway and output by a pulsed beam source into a first surface of the transparent workpiece. The pulsed laser beam includes pulse bursts having 2 sub-pulses per pulse burst or more, a sub-pulse period $T_p$ is 25 ns or greater, and the pulsed laser beam forms a pulsed laser beam focal line in the transparent workpiece, the pulsed laser beam focal line generating an induced absorption in the transparent workpiece, the induced absorption producing a defect within the transparent workpiece. The pulsed laser beam focal line includes a wavelength $\lambda$, a spot size $w_o$, and a Rayleigh range $Z_R$ that is greater than $$F_D \frac{\pi w_o^2}{\lambda},$$

where $F_D$ is a dimensionless divergence factor comprising a value of 10 or greater.

A thirty-third aspect of the present disclosure includes the method of the thirty-second aspect, wherein the sub-pulse period $T_p$ is 50 ns or greater.

A thirty-fourth aspect of the present disclosure includes the method of the thirty-second aspect or the thirty-third, wherein each pulse burst of the pulsed laser beam has from 2 sub-pulses to 5 sub-pulses.

A thirty-fifth aspect of the present disclosure includes the method of any of the thirty-second through thirty-fourth aspects, wherein an energy of each sub-pulse of the pulse burst differs from the energy of other sub-pulses of the pulse burst by 5% or less.

A thirty-sixth aspect of the present disclosure includes the method of any of the thirty-second through thirty-fifth aspects, further including translating at least one of the transparent workpiece and the pulsed laser beam relative to each other along a contour line to form a contour comprising a plurality of defects, wherein the contour is linear and has a break resistance of 20 MPa or less when measured with either the LIT or the LIC.

A thirty-seventh aspect of the present disclosure includes the method of the thirty-sixth aspect, wherein the contour has a break resistance of 10 MPa or less when measured with either the LIT or the LIC.

A thirty-eighth aspect of the present disclosure includes the method of the thirty-sixth aspect, wherein the contour has a break resistance of 5 MPa or less when measured with either the LIT or the LIC.

A thirty-ninth aspect of the present disclosure includes the method of any of the thirty-sixth through thirty-eighth aspects, wherein a spacing between adjacent defects of the plurality of defects is from 10 µm to 30 µm.

According to fortieth aspect of the present disclosure a transparent workpiece includes a first surface opposite a second surface and a plurality of defects disposed in the transparent workpiece between the first surface and the second surface defining a contour of the plurality of defects. Each of the plurality of defects includes a defect diameter of 7 µm or greater, each of the plurality of defects include a modified refractive index relative to unmodified regions of the transparent workpiece, and each of the plurality of defects are formed by a laser generated induced absorption within the transparent workpiece.

A forty-first aspect of the present disclosure includes the method of the fortieth aspect, wherein each of the plurality of defects has a diameter of 8 µm or greater.

A forty-second aspect of the present disclosure includes the method of the fortieth aspect or forty-first aspect, wherein the contour of the plurality of defects is linear.

A forty-third aspect of the present disclosure includes the method of the fortieth through forty-second aspects, wherein each of the plurality of defects extend from the first surface to the second surface.

A forty-fourth aspect of the present disclosure includes the method of the fortieth through forty-third aspects, wherein a spacing between adjacent defects of the plurality of the defects is from 10 μm to 30 μm.

A forty-fifth aspect of the present disclosure includes the method of the fortieth through forty-fourth aspects, wherein the transparent workpiece is unstressed.

A forty-sixth aspect of the present disclosure includes the method of the fortieth through forty-fifth aspects, wherein the contour is linear and has a break resistance of 20 MPa or less when measured with either the LIT or the LIC.

A forty-seventh aspect of the present disclosure includes the method of the forty-sixth aspect, wherein the contour is linear and has a break resistance of 10 MPa or less when measured with either the LIT or the LIC.

A forty-eighth aspect of the present disclosure includes the method of the forty-sixth aspect, wherein the contour is linear and has a break resistance of 5 MPa or less when measured with either the LIT or the LIC.

A forty-ninth aspect of the present disclosure includes the method of the fortieth through forty-eighth aspects, wherein the transparent workpiece is borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11A1 depicts a cross-sectional beam plot of an example pulsed laser beam focal line, according to one or more embodiments shown and described herein;

FIG. 11A2 depicts a cross-sectional beam plot of another example pulsed laser beam focal line, according to one or more embodiments shown and described herein;

FIG. 11A3 depicts a cross-sectional beam plot of another example pulsed laser beam focal line, according to one or more embodiments shown and described herein;

FIG. 11A4 depicts a cross-sectional beam plot of another example pulsed laser beam focal line, according to one or more embodiments shown and described herein;

DETAILED DESCRIPTION

Figure 1A:
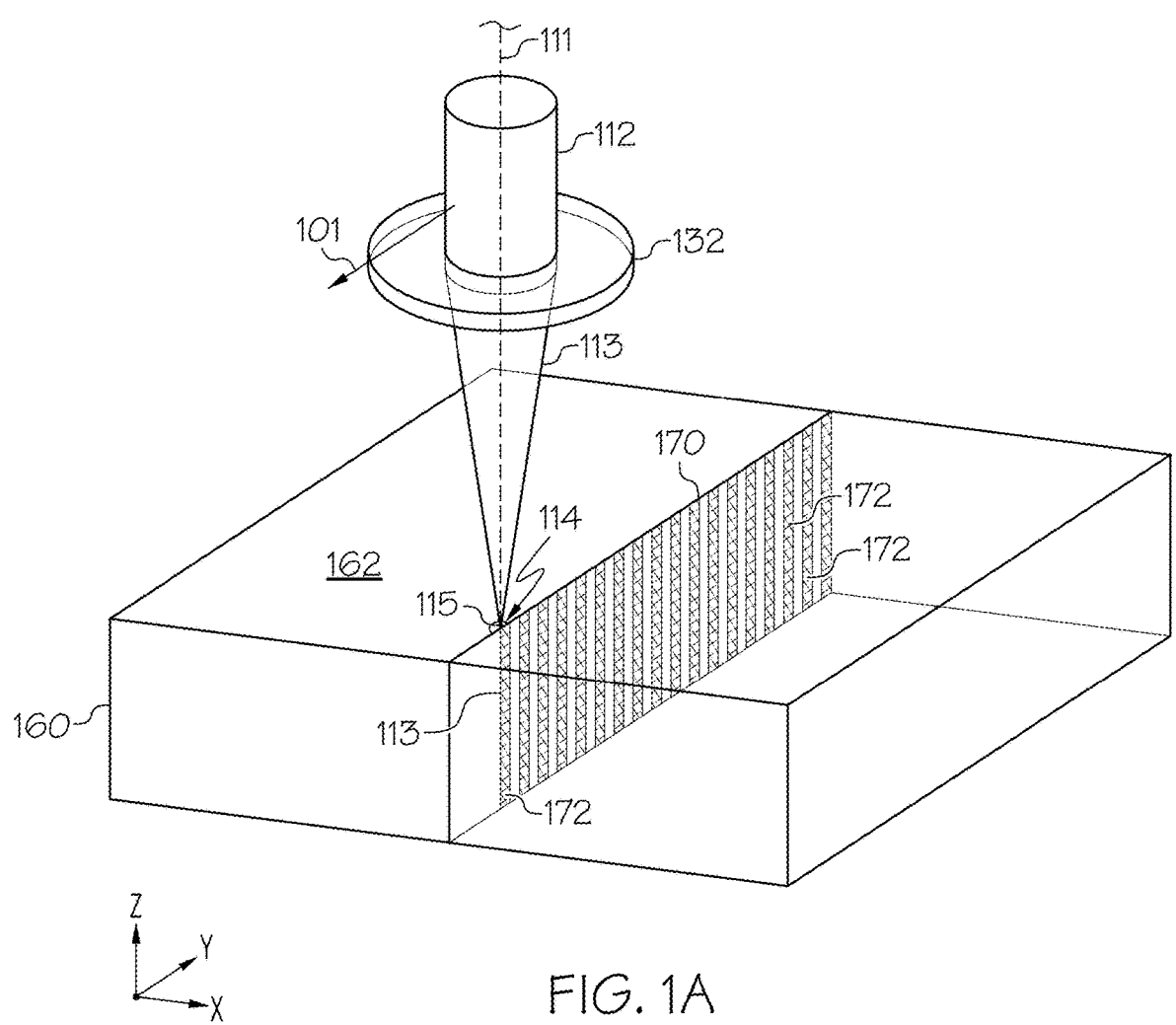
FIG. 1A schematically depicts the formation of a contour of defects in a transparent workpiece, according to one or more embodiments described herein.

Reference will now be made in detail to embodiments of laser processing a transparent workpiece using a pulsed laser beam, examples of which are illustrated in the accompanying drawings. Whenever possible, the same reference numerals will be used throughout the drawings to refer to the same or like parts. According to one or more embodiments described herein, a transparent workpiece may be laser processed to form a contour in the transparent workpiece that comprises a series of defects along a line of intended separation for separating the transparent workpiece. The laser processing methods described herein use pulsed laser beams produced in pulse bursts having two or more sub-pulses per pulse burst, where the relative energy and timing of the sub-pulses of the pulse burst are tailored to facilitate the formation of high quality defects that form a contour having low break resistance. In particular, break resistance of the contour may be reduced when the defects are formed by a pulse burst with an increased burst duration, an increased sub-pulse period, or both. By tailoring pulse bursts to minimize break resistance, lower burst energy pulse bursts and larger defect spacing may be used while still retaining sufficiently low break resistance. Larger defect spacing means that faster linear cutting speeds may be achieved and the combination of low burst energy, large defect spacing, and low break resistance minimizes damage in the resultant separated article(s) formed by separating the transparent workpiece along the contour, which leads to high edge strength of the surfaces formed by separation along the contour. Various embodiments of laser processing transparent workpieces will be described herein with specific reference to the appended drawings.

As used herein, "laser processing" comprises directing a laser beam onto and/or into a transparent workpiece. In some embodiments, laser processing further comprises translating the laser beam relative to the transparent workpiece, for example, along a contour line or other pathway. Examples of laser processing include using a laser beam to form a contour comprising a series of defects that extend into the transparent workpiece and using an infrared laser beam to heat the transparent workpiece. Laser processing may separate the transparent workpiece along one or more desired lines of separation. However, in some embodiments, additional non-laser steps, such as applying mechanical force, may be utilized to separate the transparent workpiece along one or more desired lines of separation.

As used herein, "beam spot" refers to a cross section of a laser beam (e.g., a beam cross section) at the impingement location of the laser beam at an impingement surface of a transparent workpiece, i.e., the surface of a transparent workpiece upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "pulsed laser beam focal line," refers to a pattern of interacting (e.g., crossing) light rays of a pulsed laser beam that forms a focal region elongated in the beam propagation direction. In conventional laser processing, a pulsed laser beam is tightly focused to a focal point. The focal point is the point of maximum intensity of the pulsed laser beam and is situated at a focal plane in a transparent workpiece. In the elongated focal region of a pulsed laser beam focal line, in contrast, the region of maximum intensity of the pulsed laser beam extends beyond a point to a line aligned with the beam propagation direction. A pulsed laser beam focal line is formed by converging light rays of a pulsed laser beam that intersect (e.g., cross) to form a continuous series of focal points aligned with the beam propagation direction. The pulsed laser beam focal lines described herein are formed using a quasi-non-diffracting beam, mathematically defined in detail below.

As used herein, "contour line," corresponds to the set of intersection points of the laser beam with the incident surface of the transparent workpiece resulting from relative motion of the laser beam and the transparent workpiece. A contour line can be a linear, angled, polygonal or curved in shape A contour line can be closed (i.e. defining an enclosed region on the surface of the transparent workpiece) or open (i.e. not defining an enclosed region on the surface of the transparent workpiece). The contour line represents a boundary along which separation of the transparent workpiece into two or more parts is facilitated. Separation occurs spontaneously or with the assistance of external thermal or mechanical energy.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, refractive index changes, densifications, or other deformities in the transparent workpiece produced by a pulsed laser beam focal line. Defects may also be referred to, in various embodiments herein, as defect lines or damage tracks. A defect or damage track is formed through interaction of a pulsed laser beam focal line with the transparent workpiece. As described more fully below, the pulsed laser beam focal line is produced by a pulsed laser. A defect at a particular location along the contour line is formed from a pulsed laser beam focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (µm) to about 10 mm (such as from about 100 µm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, NY (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY Moreover, the transparent workpiece may comprise other components which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution I(X,Y,Z), where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Figure 1B:
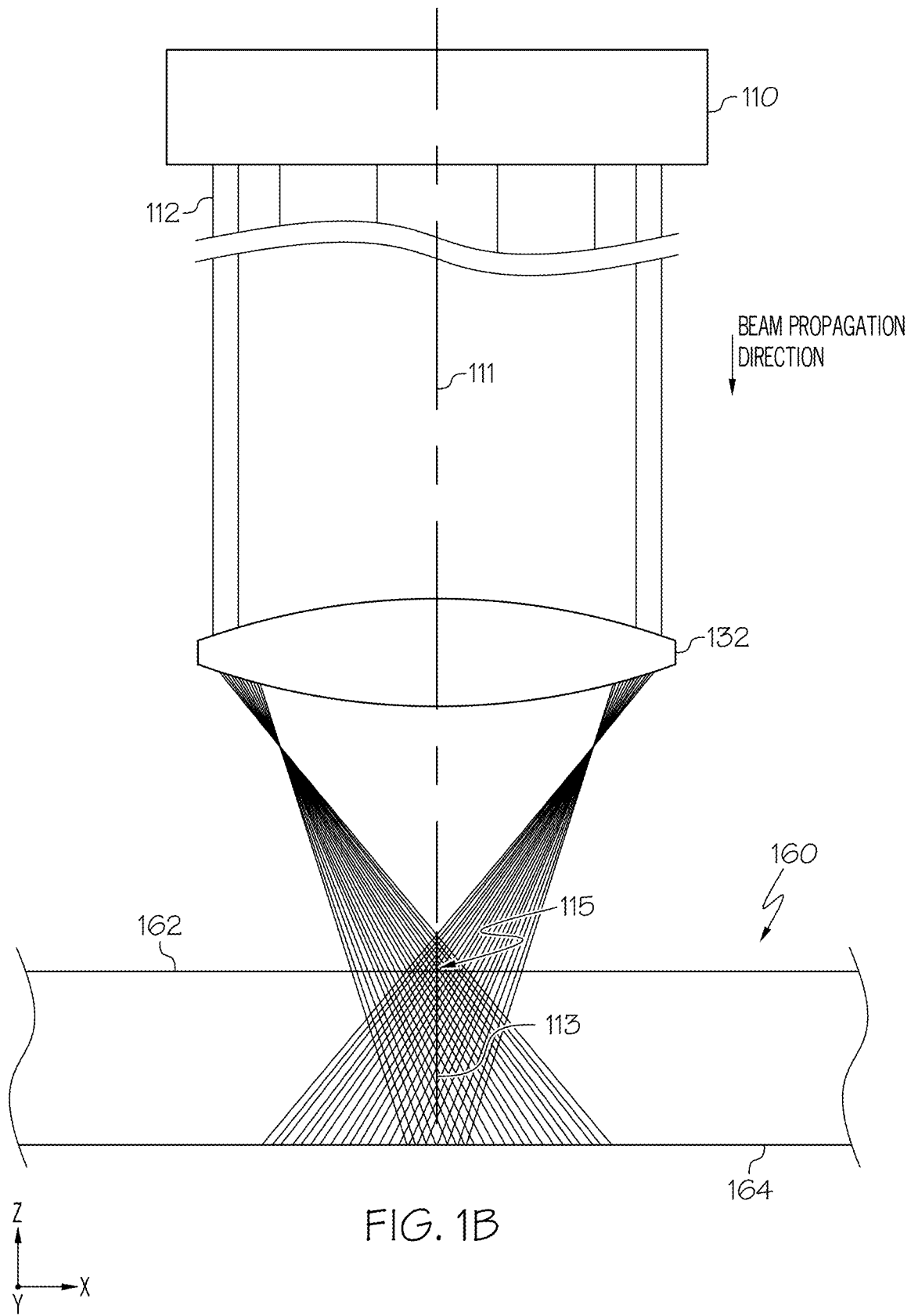
FIG. 1B schematically depicts an example pulsed laser beam focal line during processing of a transparent workpiece, according to one or more embodiments described herein.
Figure 2A:
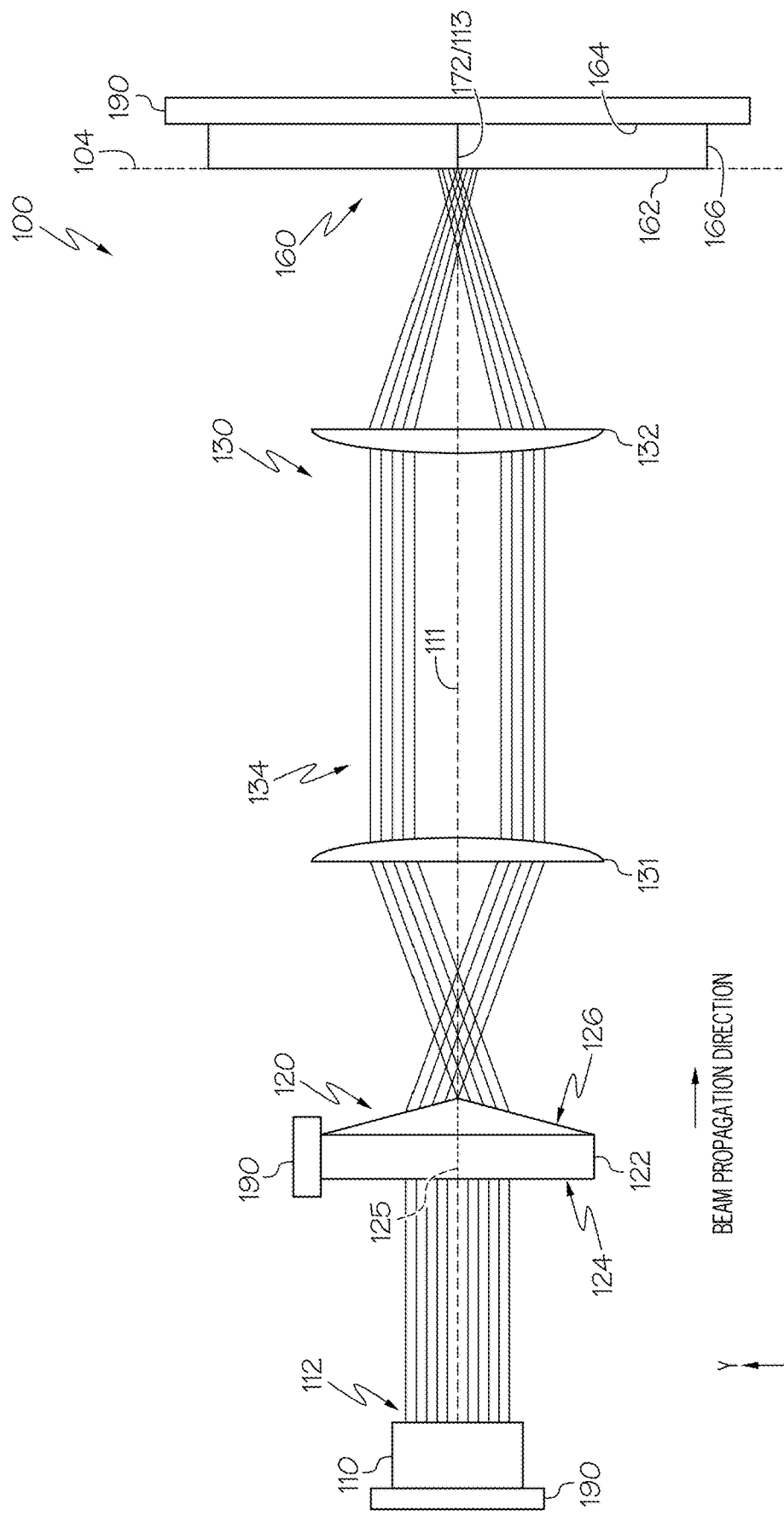
FIG. 2A schematically depicts an optical assembly for pulsed laser processing, according to one or more embodiments described herein.

Referring to FIGS. 1A and 1B and 2A, the pulsed laser beam 112 used to form the defects further has an intensity distribution I(X,Y,Z), where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 2A. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent workpiece 160.

The length of the laser beam focal line produced from a quasi-non-diffracting beam is determined by the Rayleigh range of the quasi-non-diffracting beam. Particularly, the quasi-non-diffracting beam defines a laser beam focal line 113 having a first end point and a second end point each defined by locations where the quasi-non-diffracting beam has propagated a distance from the beam waist equal to a Rayleigh range of the quasi-non-diffracting beam. The length of the laser beam focal line corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Provisional Application Ser. No. 62/402,337 and Dutch Patent Application No. 2017998, which are incorporated by reference in their entireties.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form defects 172 because, when focused to small enough spot sizes (such as spot sizes in the range of microns, such as about 1-5 µm or about 1-10 µm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \quad (1)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. For a non-diffracting or quasi-non-diffracting beam the distance (Rayleigh range), $Z_R$ in Equation (1), over which the effective spot size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (1) with a value of $F_D \geq 10$. As the value of $F_D$ increases, the pulsed laser beam 112 approaches a more nearly perfectly non-diffracting state.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

Referring now to FIGS. 1A and 1B a transparent workpiece 160 is schematically depicted undergoing laser processing according to the methods described herein. In particular, FIGS. 1A and 1B schematically depict directing a pulsed laser beam 112 that is output by a pulsed beam source 110, such as a Gaussian pulsed beam source, and oriented along a beam pathway 111 into the transparent workpiece 160 to form a defect 172. In particular, the pulsed laser beam 112 propagates along the beam pathway 111 and is oriented such that the pulsed laser beam 112 may be focused into a pulsed laser beam focal line 113 within the transparent workpiece 160, for example, using an aspheric optical element 120 and one or more lenses (FIG. 2A). The pulsed laser beam focal line 113 generates an induced absorption within the transparent workpiece 160 to produce the defect 172 within the transparent workpiece 160. Furthermore, a contour of defects 172 may be formed by translating at least one of the pulsed laser beam 112 and the transparent workpiece 160 relative to one another such that the pulsed laser beam 112 translates relative to the transparent workpiece 160 in a translation direction 101.

As also shown in FIG. 1A, the pulsed laser beam 112 forms a beam spot 114 projected onto a first surface 162 of the transparent workpiece 160, which further comprises a second surface 164, opposite the first surface 162, and an edge surface 166 extending between the first surface 162 and the second surface 164. While the pulsed laser beam 112 is depicted initially irradiating the transparent workpiece 160 at an impingement location 115 on the first surface 162 in FIG. 1A (such that the first surface 162 comprises an impingement surface), it should be understood that in other embodiments, the pulsed laser beam 112 may instead initially irradiate the transparent workpiece 160 at the second surface 164.

In some embodiments, the pulsed laser beam 112 may be focused into the pulsed laser beam focal line 113 using a lens 132. While a single lens 132 is depicted in FIGS. 1A and 1B, some embodiments may include a lens assembly 130 including a first lens 131 and a second lens 132, and repetitions thereof (FIG. 2A) to focus the pulsed laser beam 112 into the pulsed laser beam focal line 113. Other standard optical elements (e.g. prisms, beam splitters etc.) may also be included in lens assembly 130. As depicted in FIG. 1A, the pulsed laser beam 112 may comprise an annular shape when impinging the lens 132. While the lens 132 is depicted focusing the pulsed laser beam 112 into the pulsed laser beam focal line 113 in FIG. 1A, other embodiments may use the aspheric optical element 120 (FIG. 2A), which modifies the pulsed laser beam 112 such that the pulsed laser beam 112 has a quasi-non-diffracting character downstream the aspheric optical element 120, to also focus the pulsed laser beam 112 into the pulsed laser beam focal line 113. In other words, in some embodiments, the lens 132 may be the final focusing element and in other embodiments, the aspheric optical element 120 may be the final focusing element. The pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

Referring now to FIG. 2A, an optical assembly 100 for producing a pulsed laser beam 112 that is quasi-non-diffracting and forms the pulsed laser beam focal line 113 at the transparent workpiece 160 using the aspheric optical element 120 (e.g., an axicon 122) is schematically depicted. The optical assembly 100 includes a pulsed beam source 110 that outputs the pulsed laser beam 112, and the lens assembly 130 comprising the first lens 131 and the second lens 132. The transparent workpiece 160 may be positioned such that the pulsed laser beam 112 output by the pulsed beam source 110 irradiates the transparent workpiece 160, for example, after traversing the aspheric optical element 120 and thereafter, both the first lens 131 and the second lens 132.

The aspheric optical element 120 is positioned within the beam pathway 111 between the pulsed beam source 110 and the transparent workpiece 160. In operation, propagating the pulsed laser beam 112, e.g., an incoming Gaussian beam, through the aspheric optical element 120 may alter, for example, phase alter, the pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens (e.g., negative axicon), a positive refractive axicon lens, a reflective axicon lens, a diffractive axicon lens, a phase axicon, or the like.

While the optical assembly 100 is primarily described as altering the pulsed laser beam 112 into a quasi-non-diffracting beam using the aspheric optical element 120, it should be understood that a quasi-non-diffracting beam may also be formed by other phase-altering optical elements, such as a spatial light modulator, an adaptive phase plate, a static phase plate, a deformable mirror, diffractive optical grating, or the like. Each of these phase-altering optical elements, including the aspheric optical element 120, modify the phase of the pulsed laser beam 112, to reduce beam divergence, increase Rayleigh range, and form a quasi-non-diffracting beam as mathematically defined above.

In some embodiments, when the aspheric optical element 120 comprises an axicon 122 (as depicted in FIG. 2A), the axicon 122 may have a laser output surface 126 (e.g., conical surface) having an angle of about 1.2°, the angle measured relative to the laser input surface 124 (e.g., flat surface) upon which the pulsed laser beam 112 enters the axicon 122. The angle may be from 0.5° to 5°, such as from 1° to 1.5°, or from 0.5° to 20°, for example, 0.5°, 1°, 1.5°, 2°, 2.5°, 5°, 7.5°, 10°, 15°, or any range having any two of these values as endpoints, or any open-ended range having any of these values as a lower bound. Further, the laser output surface 126 terminates at a conical tip. Moreover, the aspheric optical element 120 includes a centerline axis 125 extending from the laser input surface 124 to the laser output surface 126 and terminating at the conical tip. In operation, the aspheric optical element 120 phase alters the incoming pulsed laser beam 112 to shape the incoming pulsed laser beam 112 (e.g., an incoming Gaussian beam) into a quasi-non-diffracting beam, which, in turn, is directed through the first lens 131 and the second lens 132.

Referring still to FIG. 2A, the lens assembly 130 comprises two sets of lenses, each set comprising the first lens 131 positioned upstream the second lens 132. The first lens 131 may collimate the pulsed laser beam 112 within a collimation space 134 between the first lens 131 and the second lens 132 and the second lens 132 may focus the pulsed laser beam 112. Further, the most downstream positioned second lens 132 of the lens assembly 130 may focus the pulsed laser beam 112 into the transparent workpiece 160, which may be positioned at the imaging plane 104 of this second lens 132. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise other collimating lenses and the second lens 132 may comprise a meniscus lens, an asphere, or another higher-order corrected focusing lens. In operation, the lens assembly 130 may control the position of the pulsed laser beam focal line 113 along the beam pathway 111. Further, the lens assembly 130 may comprise an 8F lens assembly, a 4F lens assembly comprising a single set of first and second lenses 131, 132, or any other known or yet to be developed lens assembly 130 for focusing the pulsed laser beam 112 into the pulsed laser beam focal line 113. Moreover, it should be understood that some embodiments may not include the lens assembly 130 and instead, the aspheric optical element 120 may focus the pulsed laser beam 112 into the pulsed laser beam focal line 113.

Referring again to FIGS. 1A-2A, the pulsed beam source 110 is configured to output pulsed laser beams 112. In operation, the defects 172 of the contour 170 are produced by interaction of the transparent workpiece 160 with the pulsed laser beam 112 output by the pulsed beam source 110.

In operation, the pulsed laser beam 112 output by the pulsed beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

In some embodiments, the pulsed beam source 110 may output a pulsed laser beam 112 comprising a wavelength of, for example, 1064 nm, 1030 nm, 532 nm, 530 nm, 355 nm, 343 nm, or 266 nm, or 215 nm. For example, the wavelength of the pulsed laser beam 112 may be less than 600 nm. Further, the pulsed laser beam 112 used to form defects 172 in the transparent workpiece 160 may be well suited for materials that are transparent to the selected pulsed laser wavelength. Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound. As used herein, the dimension "/mm" means per millimeter of distance within the transparent workpiece 160 in the beam propagation direction of the pulsed laser beam 112 (i.e., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

Referring still to FIGS. 1A-2A, in operation, the contour 170 may be formed by irradiating a contour line 165 with the pulsed laser beam 112 and translating at least one of the pulsed laser beam 112 and the transparent workpiece 160 relative to each other along the contour line 165 in the translation direction 101 to form the defects 172 of the contour 170. While the contour 170 depicted in FIG. 1A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like.

Directing or localizing the pulsed laser beam 112 into the transparent workpiece 160 generates an induced absorption (e.g., MPA) within the transparent workpiece 160 and deposits enough energy to break chemical bonds in the transparent workpiece 160 at spaced locations along the contour line 165 to form the defects 172. According to one or more embodiments, the pulsed laser beam 112 may be translated across the transparent workpiece 160 by motion of the transparent workpiece 160 (e.g., motion of a translation stage 190 coupled to the transparent workpiece 160), motion of the pulsed laser beam 112 (e.g., motion of the pulsed laser beam focal line 113), or motion of both the transparent workpiece 160 and the pulsed laser beam focal line 113. By translating at least one of the pulsed laser beam focal line 113 relative to the transparent workpiece 160, the plurality of defects 172 may be formed in the transparent workpiece 160.

In some embodiments, the defects 172 may generally be spaced apart from one another by a distance along the contour 170 of from 0.1 μm to 500 μm, such as, 1 μm to 200 μm, 2 μm to 100 μm, or 10 μm to 30 μm, 0.1 μm to 50 μm, 5 μm to 15 μm, 5 μm to 12 μm, 7 μm to 15 μm, 8 μm to 15 μm, or 8 μm to 12 μm, such as 50 μm or less, 45 μm or less, 40 μm or less, 35 μm or less, 30 μm or less, 25 μm or less, 20 μm or less, 15 μm or less, 10 μm or less, such as 100 μm, 75 μm, 50 μm, 40 μm, 30 μm, 25 μm, 10 μm, 5 μm, or any range having any two of these values as endpoints, or any open-ended range having any of these values as a lower bound. Further, the translation of the transparent workpiece 160 relative to the pulsed laser beam 112 may be performed by moving the transparent workpiece 160 and/or the pulsed beam source 110 using one or more translation stages 190.

In some embodiments, after forming the contour 170 of defects 172, the transparent workpiece 160 may be further acted upon in a subsequent separating step to induce separation of the transparent workpiece 160 along the contour 170. The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small when compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 μm to 13 μm, for example, a range of 4 μm to 12 μm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid-state laser, a laser diode, or combinations thereof. In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160. In the embodiments herein "a strengthened glass substrate" such as a strengthened transparent workpiece 160 is also referred to as a stressed glass substrate (or stressed transparent workpiece 160) as this substrate comprises a compressive stress layer formed, for example, by ion-exchange or thermal tempering. Conversely, in the embodiments described herein "an unstrengthened glass substrate" such as an unstrengthened transparent workpiece 160, is also referred to as an unstressed glass substrate (or unstressed transparent workpiece 160) as this substrate lacks a compressive stress layer.

Referring still to FIGS. 1A-2A, one challenge in the above process is that for the transparent workpiece 160 to separate along the contour 170, the damage in the transparent workpiece 160 caused by the defects 172 (i.e., the damage along the depth of the defects 172) must be large enough that a crack propagating through the transparent workpiece 160 (preferably along the contour 170) connects from defect to defect, in other words, connecting adjacent defects 172. As described above, in some embodiments, stress present in the transparent workpiece 160, for example, when the transparent workpiece 160 comprises a strengthened glass substrate, may induce crack propagation between the defects 172 (i.e., along the contour 170) without an additional stressor (e.g., without a mechanical, chemical, or thermal stressor). However, when an additional stressor is needed, it is beneficial that the defects 172 of the contour 170 are of sufficient quality to enable consistent separation with as little applied stress as possible. Changing the morphology or improving the quality of the defects 172 may reduce the break resistance of the contour 170. The "break resistance," of the contour 170 is the stress (in MPa) under which crack propagation initiates along the contour 170.

Figure 2B:
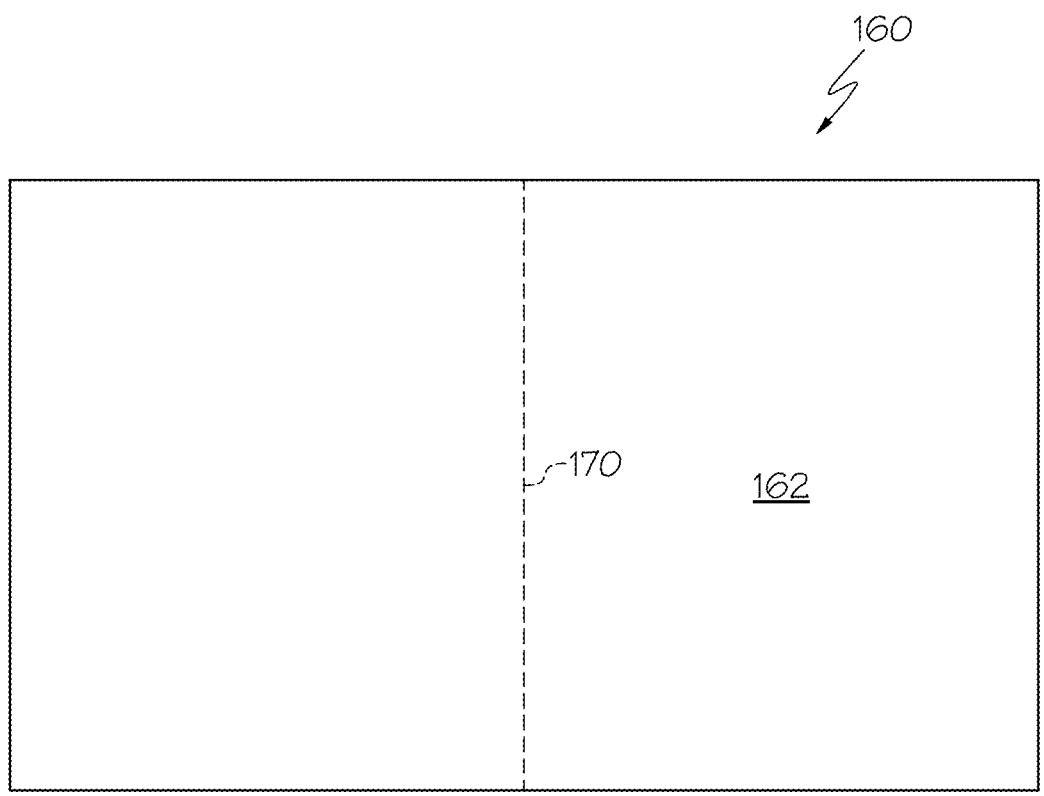
FIG. 2B schematically depicts a transparent workpiece comprising a contour of defects formed using the optical assembly of FIG. 2A, according to one or more embodiments shown and described herein.
Figure 2C:
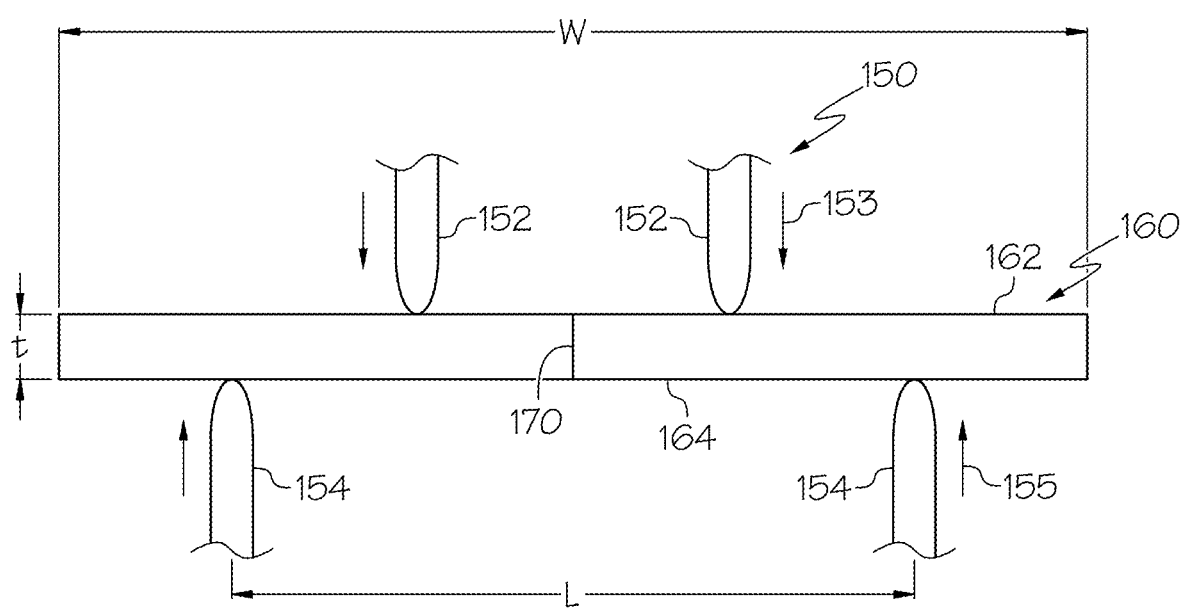
FIG. 2C schematically depicts the transparent workpiece of FIG. 2B undergoing a four point bending test, according to one or more embodiments shown and described herein.

Referring also to FIGS. 2B and 2C, the transparent workpiece 160 is depicted while undergoing a break resistance test using a four-point bend apparatus 150 after formation of the contour 170 to determine the break resistance of the transparent workpiece 160. As shown in FIG. 2C, the four-point bend apparatus 150 comprises two first side load points 152 and two second side load points 154. The two first side load points 152 and the two second side load points 154 have blunt, radiused ended such that they can generate stress in the transparent workpiece 160 without forming surface flaws in the location they contact. For example, the ends of the first side load points 152 and the two second side load points 154 may comprise a 5 mm radius. The first side load points 152 are shown in contact with the first surface 162 of the transparent workpiece 160 and the second side load points 154 are shown in contact with the second surface 164 of the transparent workpiece 160. The first side load points 152 are laterally spaced nearer to one another than the second side load points 154. In FIG. 2C, the first side load points 152 are spaced evenly apart from the contour 170 and the second side load points 154 are spaced evenly apart from the contour 170. In operation, the first side load points 152 translate in a first direction 153 to apply a force to the first surface 162 of the transparent workpiece 160, which causes the supporting second side load points 154 (which do not translate) to also apply force is a second direction 155, opposite the first direction 153. For example, the first side load point 152 may translate in the first direction at a velocity of 5 mm/second to apply a force to the transparent workpiece 160.

The break resistance of the contour 170 may be quantified using the four-point bending apparatus 150, which applies force and bends the transparent workpiece 160. While not intending to be limited by the theory, the four-point bending apparatus 150 places a large region of the transparent workpiece 160 under approximately uniform stress. In operation, the applied force is increased and measured as a function of time until transparent workpiece 160 breaks along contour 170. The maximum applied force corresponds to the force that causes the transparent workpiece 160 to break (or "separate") along the contour 170. Using the dimensions of the transparent workpiece 160 and the maximum applied force, the stress at the contour 170 resulting from the maximum applied force to induce separation of the transparent workpiece 160 along the contour 170 may can be calculated. The applied force is measured as a function of time, and the maximum force that is measured just as the transparent workpieces 160 breaks (or "separates") is recorded. Then, as long as the dimensions of the transparent workpiece 160 and the four-point bend apparatus 150 applying the force are known, through standard mechanical engineering principles, one can calculate the amount of stress that was present at the location of the contour 170 of defects 172 to induce separation. The following formula may be used to calculate the stress at failure, in units of megaPascals (MPa):

$$\text{Stress (MPa)} = \frac{3LF}{4t^2 w} \quad (1)$$

Where L is the support span distance (mm), which is the distance between the two second side load points 154, F is the applied load (Newtons), w is the width of the transparent workpiece 160 (mm), and t is the thickness of the transparent workpiece 160 (mm). The above assumes the span under load, which is the distance between the two first side load points 152, is ½ the distance of the support span distance L holding the transparent workpiece 160. Compared to other testing methods, such as 3-point bend, the advantage of the 4-point bend method is it places a large region of the transparent workpiece 160 under approximately uniform stress, so that the stress at the contour 170 of defects 172, which is a linear contour 170 of defects 172, is well known. In contrast, 3-point bend does not apply uniform stress and thus knowing the exact stress at the contour 170 of defects 172 at the time of fracture is challenging. The exact size and thickness of the transparent workpiece 160 can be altered, but the configuration of the four-point bend apparatus 150 must be adjusted to ensure that that it is appropriately sized to provide the uniform stress near the center of the transparent workpiece 160 under test, and the calculations for stress must account for the exact dimensional characteristics (span under load, width, thickness) of the transparent workpiece 160.

The 4-point bend test causes one side of the transparent workpiece 160 to become convex under force, placing it in tension, and thus inducing failure primarily on that one side of the transparent workpiece 160. The laser exposure can result in different amounts material damage or modification at the top vs. bottom of the transparent workpiece 160, for example if the intensity of the pulsed laser beam focal line 113 is more intense at the top than at the bottom of the transparent workpiece 160. Hence, when the transparent workpiece 160 having the contour 170 of defects 172 is bent, it is important to track whether or not the top vs. bottom of the transparent workpiece 160 is being placed in tension. By choosing which side of the transparent workpiece 160 is placed up or down in the four-point bend apparatus 150, the test can be done both for either the "Laser Incidence side in Tension" (LIT), or for the "Laser Incidence side in Compression (LIC)." In the case of a pulsed laser beam focal line 113 that is well centered on the thickness of the transparent workpiece 160 when laser forming the defects 172, the LIT/LIC break resistance results can be very similar (within 1 MPa, for example). But if the pulsed laser beam focal line 113 is not well centered in the transparent workpiece 160 when laser forming the defects 172, the LIT/LIC results can be observed to be distinctly different. Note that to evaluate the break resistance, multiple samples must be tested and the data compiled to assess the average and standard deviation of the measurements. An individual transparent workpiece 160 may have a break resistance that is higher or lower, but on average such 4-point bend measurements characterize a distribution of parts. Such a distribution mean and its standard deviation can be reasonably characterized by breaking 5-10 transparent workpieces 160 per laser condition, with more statistics being beneficial."

Moreover, while not intending to be limited by theory, the four-point bending apparatus 150 causes one side of the transparent workpiece 160 to become convex under force, placing it in tension (e.g., the second surface 164 in FIG. 2C), and thus inducing crack propagation and separation of the contour 170, primarily on that one side of the transparent workpiece 160. While still not intending to be limited by theory, laser exposure can result in different amounts of material damage or modification at the first surface 162 versus the second surface 164 of the transparent workpiece 160, for example, if the intensity of the pulsed laser beam focal line 113 is more intense at (or nearer) the first surface 162 than at (or nearer) the second surface 164. Thus, when an example transparent workpiece 160 having a contour 170 is bent, the surfaces of the transparent workpiece 160 placed under tension and compression, respectively, may be tracked. In particular, when the impingement surface (e.g., the first surface 162 in the embodiments described herein) is bent convex and placed in tension, the measurement may be denoted as "laser incidence side in tension" (LIT) and when the impingement surface (e.g., the first surface 162 in the embodiments described herein) is bent concave and placed in compression, the measurement may be denoted as "laser incidence side in compression" (LIC). While not intending to be limited by theory, when the length of the laser beam focal line 113 is approximately centered in the thickness direction of the transparent workpiece 160, the LIT and LIC break resistances of the resultant contour 170 of defects 172 may be similar (such as within 1 MPa). However, when the laser beam focal line 113 is off-center or not approximately centered in the thickness direction of the transparent workpiece 160, the LIT and LIC break resistances of the resultant contour 170 of defects 172 may differ appreciably.

Referring still to FIGS. 1A-2C, when the contour 170 comprises a low break resistance, less stress is needed to separate the transparent workpiece 160 along the contour 170 and by applying less stress, unintended cracking (i.e., microcracks extending into the transparent workpiece 160 in directions that are not along the contour line 165) and chipping may be minimized. In contrast, when the contour 170 comprises a high break resistance, more stress is needed to separate the transparent workpiece 160 along the contour 170 and applying high stress may cause uncontrollable cracking (e.g., cracking that does not follow the contour line 165), chipping, and separation failure. In the embodiments described herein, the contour 170 may comprise a break resistance of 30 MPa or less, such, 25 MPa or less, 20 MPa or less, 15 MPa or less, 10 MPa or less, or 5 MPa or less, for example, 30 MPa, 25 MPa, 20 MPa, 18 MPa, 15 MPa, 12 MPa, 10 MPa, 8 MPa, 6 MPa, 5 MPa 4 MPa, 3 MPa, 2 MPa, or any range having any two of these values as endpoints, or any open-ended range having any of these values as an upper bound.

It also should be noted that break resistance should not be confused with edge strength. It should be understood that break resistance is distinct from edge strength. Break resistance is used to assess the ease of separating a laser perforated piece of glass (e.g., the transparent workpiece 160 comprising the contour 170 of defects 172). Edge strength is used to assess the robustness of the edge of a piece of glass (e.g., the transparent workpiece 160) to flexing. For break resistance, a low value is generally considered beneficial (e.g. 15 MPa, 10 MPa, or lower), and for edge strength, a high value is general considered beneficial (e.g. 100 MPa, 150 MPa, or higher). Both break resistance and edge strength can be evaluated with a 4 point bend apparatus (e.g., the four-point bend apparatus 150). But in the case of edge strength, no defects 172 in the transparent workpiece 160, and when the transparent workpiece 160 is subjected to a 4-point bend, it is generally the flaws along the outer (cut) edge of the transparent workpiece 160 that are activated by the imparted stress, so the failure stress is measuring the "strength" of that outer edge.

Without intending to be limited by theory, it is generally possible to separate a contour 170 comprising a break resistance of about 50 MPa with strong mechanical breaking equipment. However, contours 170 having lower break resistances are desired, as low break resistance contours 170 may be separated with other methods or with less applied stress. While still not intending to be limited by theory, it is generally possible to separate a contour 170 comprising a break resistance of about 25 MPa by using an infrared laser, such as a $CO_2$ laser. When the break resistance is made lower, such as below 15 MPa, the thermal separation methods can be made faster and achieve higher yields. Moreover, contours 170 comprising a break resistance of 10 MPa or less, such as 5 MPa, may separate when minimal stress is applied, thus facilitating the use of low stress separation methods, such as using vacuum separation methods.

The ability to easily separate a transparent workpiece 160 having a contour 170 of defects 172 with thermal stress can be a function of the glass composition, since material with higher thermal expansion coefficients (e.g. Corning Gorilla® Glass codes 2318 and 2320, which comprise CTEs of about 7-9 ppm/C) will generate larger stresses for an equivalent temperature rise compared to materials with lower thermal expansion coefficients (e.g. Corning EAGLE XG® glass or LOTUS™ glass, which comprise CTEs of about 3-4 ppm/C). Glass composition can also play a role in the tolerance of the transparent workpiece 160 to applied heat, as some materials can be heated to higher temperatures without creating additional uncontrolled damage that could weaken the final separated part. In general, being able to generate a contour 170 of defects 172 that has minimal break resistance is highly desired, as this enables the most separation process options for separation, with the lowest applied heat loads, the fastest process times, and the largest tolerance to changes in environmental conditions such as humidity.

Figure 3A:
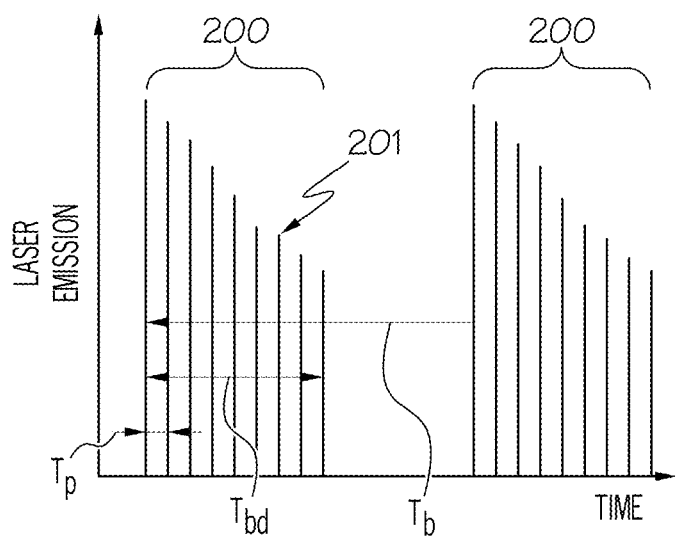
FIG. 3A graphically depicts the relative intensity of laser pulses within an exemplary pulse burst vs. time, according to one or more embodiments described herein.
Figure 3B:
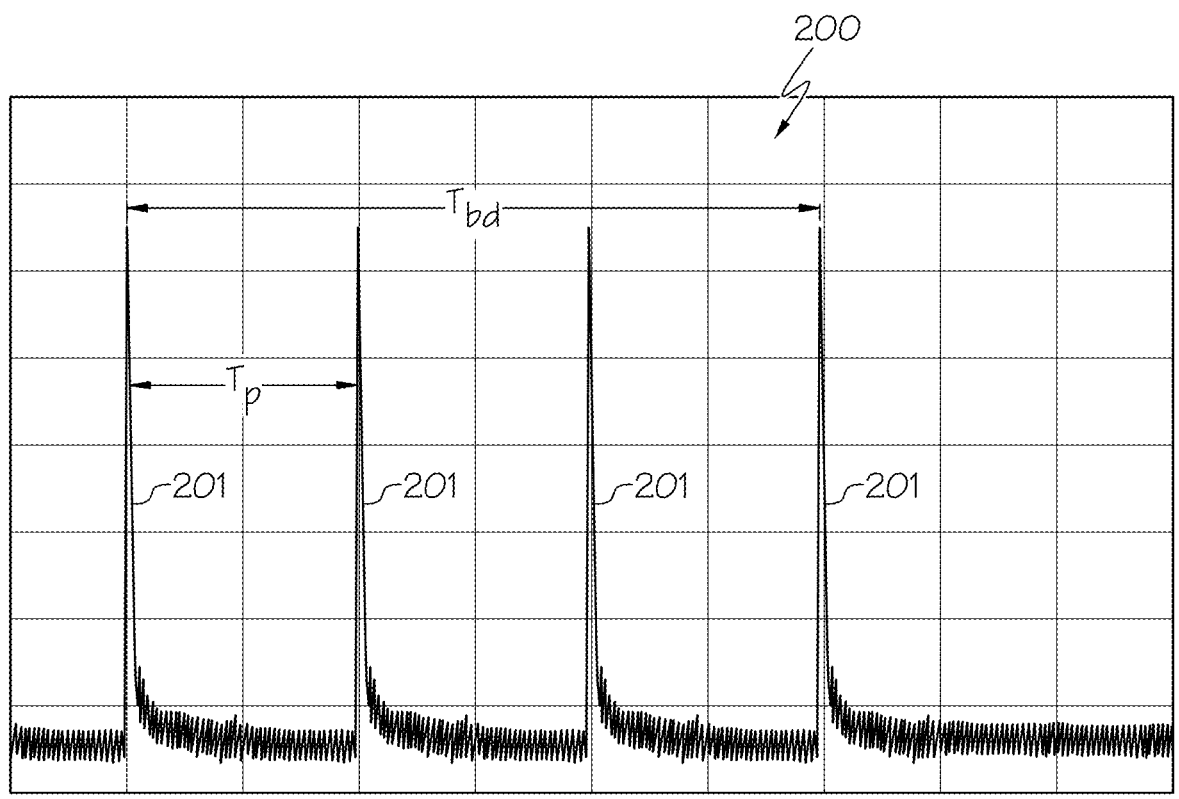
FIG. 3B graphically depicts relative intensity of laser pulses vs. time within another exemplary pulse burst, according to one or more embodiments described herein.

Referring now to FIGS. 3A and 3B, to reduce the break resistance of the contour 170, pulses produced by the pulsed beam source 110 are produced in pulse bursts 200 of two sub-pulses 201 or more per pulse burst 200, such as from 2 to 30 sub-pulses 201 per pulse burst 200 or from 5 to 20 sub-pulses 201 per pulse burst 200, for example, 2 sub-pulses 201, 3 sub-pulses 201, 4 sub-pulses 201, 5 sub-pulses 201, 10 sub-pulses 201, 15 sub-pulses 201, 20 sub-pulses 201, 25 sub-pulses 201, or the like. A pulse burst (such as pulse burst 200) is a short and fast grouping of sub-pulses (i.e., a tight cluster of sub-pulses, such as sub-pulses 201) that are emitted by the pulsed beam source 110 and interact with the material (i.e. via MPA in the material of the transparent workpiece 160). For example, a pulse burst 200 of five sub-pulses 201 each separated in time by 20 ns may be generated for a burst duration $T_{bd}$ of 80 ns. While not intending to be limited by theory, a pulse burst (such as pulse burst 200) creates an optical energy interaction with the material (such as the material of the transparent workpiece 160) that has some significant differences compared to single-pulse energy delivery at each defect site (i.e., each impingement location 115). First, a rapid succession of sub-pulses allows a sub-pulse to interact with material that is still heated, stressed, or otherwise energized by the previous laser sub-pulse. Second, for a fixed total amount of energy delivered to a defect site (i.e., the impingement location 115), distributing the energy temporally amongst multiple sub-pulses of a pulse burst allows the energy within an individual sub-pulse to remain low, which means certain non-linear refractive index or plasma based distortions of the beam (i.e., the laser beam focal line 113) can be reduced, the beam (i.e., the laser beam focal line 113) can stay more confined in focus and consistent in cross sectional shape, and energy of the laser beam focal line 113 can be absorbed by the transparent workpiece 160 through non-linear absorption more efficiently, as well as more uniformly as a function of depth.

Referring now to FIGS. 1A-3B, when the defects 172 of the one or more contours 170 are formed with pulse bursts 200 having at least two sub-pulses 201, the force necessary to separate the transparent workpiece 160 along contour 170 (i.e. the break resistance) is reduced compared to the break resistance of a contour 170 of the same shape with the same spacing between adjacent defects 172 in an identical transparent workpiece 160 that is formed using a single pulse laser having the same energy as the combined energies of the sub-pulses of the pulse burst 200. The use of pulse bursts 200 (as opposed to a single pulse operation) increases the size (e.g., the cross-sectional size) of the defects 172, which facilitates the connection of adjacent defects 172 when separating the transparent workpiece 160 along the contour 170, thereby minimizing crack formation away from contour 170 in the separated sections of the transparent workpiece 160. For example, the break resistance of a contour 170 formed using a single pulse with a given pulse energy is at least two times greater than the break resistance of a contour 170 formed using a pulse burst 200 having 2 or more sub-pulses 201 with combined energies equal to the given pulse energy. Further, the difference in break resistance between a contour 170 formed using a single pulse and a contour 170 formed using a pulse burst 200 having 2 sub-pulses 201 is greater than the difference in break resistance between a contour 170 formed using a pulse burst 200 having 2 sub-pulses 201 and a pulse burst 200 having 3 sub-pulses 201. Thus, pulse bursts 200 may be used to form contours 170 that separate more easily than contours 170 formed using a single pulse laser.

A time separation $T_b$ between each pulse burst 200 may be from about 0.1 microseconds to about 1000 microseconds, e.g., from about 1 microsecond to about 10 microseconds, or from about 3 microseconds to about 8 microseconds. The time separation $T_b$ between each pulse burst 200 is the time between the first sub-pulse in a first pulse burst and a first sub-pulse in a second pulse burst that is temporally adjacent the first pulse burst (i.e. the time separation $T_b$ corresponds to the time between the first sub-pulses of consecutive pulse bursts in a series of pulse bursts). A burst repetition rate of the pulsed laser beam 112 is related to the time separation $T_b$ between the first pulse in the first pulse burst and the first pulse in the second pulse burst (burst repetition rate=$1/T_b$). The time separation $T_b$ between the first pulse in each burst to the first pulse in the subsequent burst may be from 0.1 microseconds (10 MHz burst repetition rate) to 1000 microseconds (1 kHz burst repetition rate), such as from 0.5 microseconds (2 MHz burst repetition rate) to 40 microseconds (25 kHz burst repetition rate), or from 2 microseconds (500 kHz burst repetition rate) to 20 microseconds (50 kHz burst repetition rate), 0.5 microseconds, 5 microseconds, 10 microseconds, 15 microseconds, 25 microseconds, 50 microseconds, 100 microseconds, 150 microseconds, or any range having any two of these values as endpoints, or any open-ended range having any of these values as a lower bound. Furthermore, in some embodiments, the burst repetition rate may be in a range of from 1 kHz to 4 MHz, such as from 10 kHz to 650 kHz and from 1 kHz to 200 kHz, for example 50 kHz, 100 kHz, 250 kHz, 500 kHz, 750 kHz, 1 MHz, 2 MHz, 3 MHz, 4 MHz, or any range having any two of these values as endpoints, or any open-ended range having any of these values as a lower bound.

The pulsed laser beam 112 may have a wavelength selected based on the material of the transparent workpiece 160 being operated on such that the material of the transparent workpiece 160 is substantially transparent at the wavelength. The average laser energy per pulse burst measured at the material may be at least 40 µJ per mm of thickness of material. For example, in embodiments, the average laser energy per pulse burst may be from 40 µJ/mm to 2500 µJ/mm, or from 500 µJ/mm to 2250 µJ/mm. In a specific example, for 0.5 mm to 0.7 mm thick Corning EAGLE XG® transparent workpiece, pulse bursts of from 300 µJ to 600 µJ may cut and/or separate the workpiece, which corresponds to an exemplary range of 428 µJ/mm to 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pulse burst energy (i.e., the energy contained within a pulse burst 200 where each pulse burst 200 contains a series of sub-pulses 201; that is, the pulse burst energy is the combined energy of all sub-pulses within the pulse burst). The pulse energy (for example, pulse burst energy) may be from 25 µJ to 1000 µJ or 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound. For some glass compositions, the pulse energy (e.g., pulse burst energy) may be from 100 µJ to 250 µJ. However, for display or TFT glass compositions, the pulse energy (e.g., pulse burst energy) may be higher (e.g., from 300 µJ to 500 µJ, or from 400 µJ to 600 µJ, depending on the specific glass composition of the transparent workpiece 160). While still not intending to be limited by theory, the pulse burst energy is conserved. Thus, the more sub-pulses within the pulse burst, the lower the average energy of each individual sub-pulse. For example, for a pulse burst having a pulse burst energy of 100 µJ/burst and two sub-pulses, the 100 µJ/burst is split between the two sub-pulses for an average energy of 50 µJ per sub-pulse and for a pulse burst having a pulse burst energy of 100 µJ/burst and 10 sub-pulses, the 100 µJ/burst is split among the 10 sub-pulses for an average energy of 10 µJ per sub-pulse. In some embodiments, the pulse burst energy is distributed approximately equally among the sub-pulses such that each sub-pulse has approximately the same energy (e.g. as shown in FIG. 3B). In other embodiments, the pulse burst energy is distributed unequally among the sub-pulses such that the energies of the sub-pulses are unequal (e.g. as shown in FIG. 3A).

In addition, tailoring the relative energy and timing of the sub-pulses 201 within a pulse burst 200 may facilitate the formation of high quality defects 172 that form a contour 170 having low break resistance. Without intending to be limited by theory, Defects 172 described herein that facilitate a low break resistance comprise a large defect diameter and extend completely through the transparent workpiece 160, that is, from the first surface 162 to the second surface 164. In addition, non-axisymmetric defects (e.g., defects 372 of FIG. 11B) may also reduce break resistance. As used herein, "defect diameter" is the diameter of the modified material and/or void space of the defect 172 through the depth of the transparent workpiece 160. Example defect diameters of the defects 172 described herein include 6 µm or greater, 7 µm or greater, 8 µm or greater, or the like, such as from 6 µm to 8 µm. Further, by tailoring pulse bursts 200 to minimize break resistance, and reduce pulse burst energy, larger defect spacing may be used while still retaining favorable break resistance. Larger defect spacing means that faster linear cutting speeds may be achieved, since a laser of fixed repetition rate may be scanned across the transparent workpiece 160 at a higher speed and still make enough defects 172 to facilitate separation.

Moreover, the combination of low pulse burst energy, large defect spacing, and low break resistance minimizes damage in the resultant separated article(s) formed upon separation the transparent workpiece 160 along the contour 170, which leads to high edge strength of the surfaces formed by separation along the contour 170. In addition, utilizing the timing of the sub-pulses 201 of the pulse burst 200 to reduce the break resistance allows the pulsed laser beam 112 to be output by the pulsed beam source 110 with a low laser power while still forming the contour 170 with a sufficiently low break resistance. Thus, in some embodiments, the pulsed beam source 110 may be a lower cost, low power laser and in other embodiments, the pulsed beam source 110 may be a higher cost, high power laser that can be split into two or more laser beams to increase the throughput of the optical assembly 100. Lower break resistance also results in a faster separation process and a higher yield of article(s) separated from the transparent workpiece 160. Moreover, increasing the processing speed while using lower laser power also increases the overall energy efficiency of the process.

Referring still to FIGS. 1A-3B, the break resistance of the contour 170 may be reduced when the defects 172 are formed by a pulse burst with an increased burst duration $T_{bd}$, an increased sub-pulse period $T_p$, or both. As used herein, "sub-pulse period," (denoted $T_p$), is the time separation between temporally adjacent sub-pulses of a pulse burst. In some embodiments, each pulse burst may comprise a burst duration $T_{bd}$ of 50 ns to 1000 ns, from 100 ns to 500 ns, from 150 ns to 400 ns, for example, 100 ns greater, for example, 150 ns or greater, 175 ns or greater, 200 ns or greater, 225 ns or greater, 250 ns or greater, 275 ns or greater, 300 ns or greater, 325 ns or greater, 350 ns or greater, 360 ns or greater, 375 ns or greater, 400 ns or greater, 425 ns or greater, 450 ns or greater, 475 ns or greater, 500 ns or greater, 750 ns or greater, or any range having any two of these values as endpoints. Furthermore, the sub-pulse period $T_p$ is 10 ns or greater, for example, 15 ns or greater, 20 ns or greater, 25 ns or greater, 30 ns or greater, 35 ns or greater, 40 ns or greater, 45 ns or greater, 50 ns or greater, 60 ns or greater, 70 ns or greater, 75 ns or greater, 90 ns or greater, 100 ns or greater, 150 ns or greater, 250 ns or greater, 500 ns or greater, or the like.

In some embodiments, the sub-pulse period $T_p$ may be in a range from 1 ps to 1 µs, such as 1 ps to 500 ns, or 5 ps to 400 ns, or 10 ps to 300 ns, or 20 ps to 200 ns, or 40 ps to 100 ns, or 100 ps to 200 ns, or 100 ps to 100 ns, or 1 ns to 100 ns, or 1 ns to 50 ns, 10 ns to 30 ns, such as 100 ps, 1 ns, 10 ns, 20 ns, 50 ns, 75 ns, 100 ns, 200 ns, 500 ns, 1 ps, 5 ps, 10 ps, 15 ps, 18 ps, 20 ps, 22 ps, 25 ps, 50 ps, 75 ps, or any range having any two of these values as endpoints, or any open-ended range having any of these values as a lower bound. Moreover, the sub-pulse period $T_p$ within a single pulse burst may be relatively uniform (e.g., within about 10% of one another). The sub-pulse period $T_p$ is less than the burst duration $T_{bd}$, which is less than the time separation $T_b$ between temporally adjacent pulse bursts. Furthermore, each individual sub-pulse 201 may comprise a pulse width in a range from 1 ps to 100 ns, such as 1 ps to 10 ns, or 1 ps to 1 ns, or 1 ps to 500 ps, or 5 ps to 200 ps, or 10 ps to 100 ps, or any range having any two of these values as endpoints, or any open-ended range having any of these values as a lower bound.

Figure 4A:
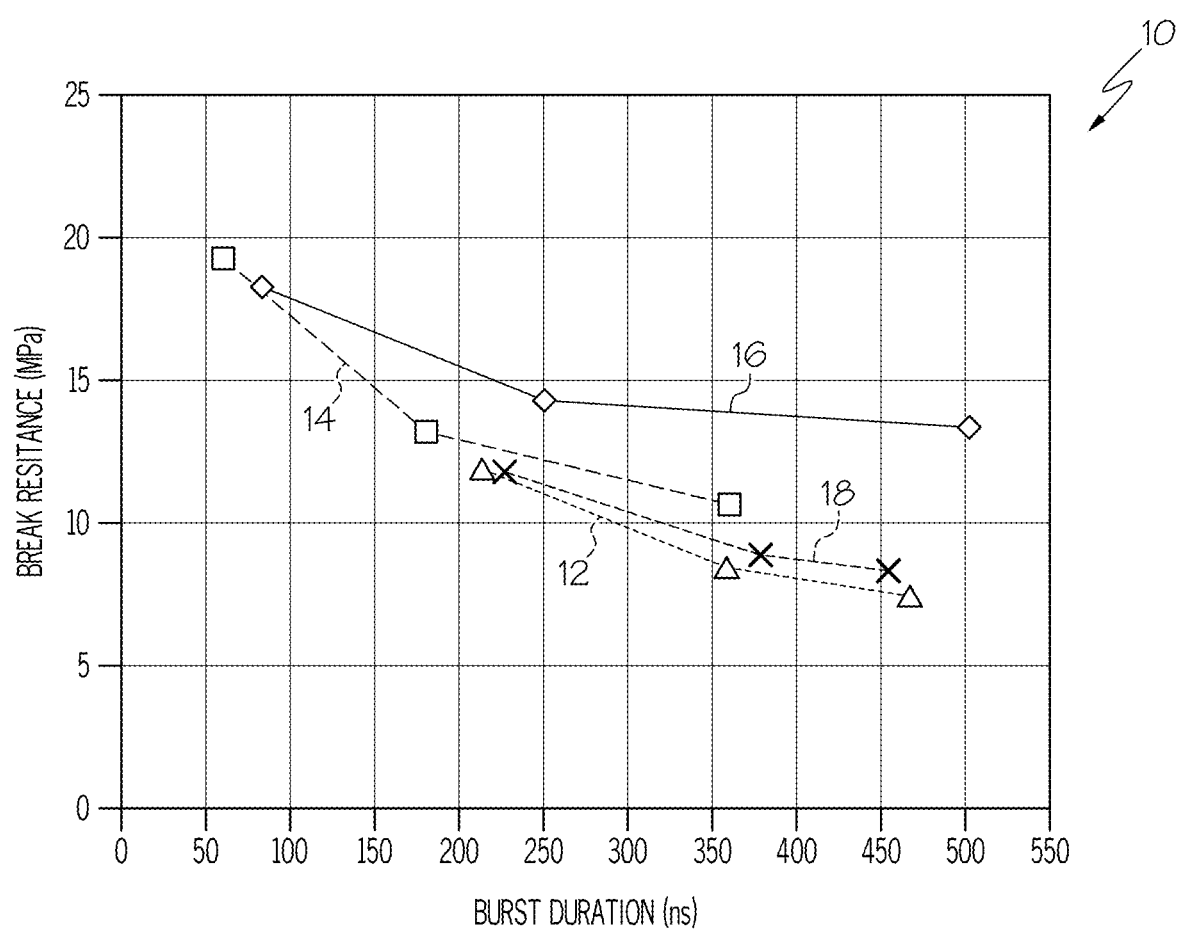
FIG. 4A graphically depicts break resistance of example contours of defects as a function of the total burst duration of a pulse burst used to form the example contours of defects, according to one or more embodiments shown and described herein.

Referring now to FIG. 4A, a graph 10 depicts the experimentally measured break resistance of example contours of defects (i.e., linear contours of defects) as a function of the burst duration $T_{bd}$ for pulse bursts having different numbers of sub-pulses 201 per pulse burst 200. In particular, the contours whose break resistance is graphically depicted in graph 10 were formed in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 10 is formed in the widthwise direction of the transparent workpiece 160 and is thus a 44 mm long contour. Line 12 shows the break resistance of a contour of defects that are spaced apart by 8 µm that are formed by pulse bursts 200 having 4 sub-pulses 201 per pulse burst 200 and a pulse burst energy in a range of 503 µJ to 510 µJ. Line 14 shows the break resistance of a contour of defects that are spaced apart by 7 µm that are formed by pulse bursts 200 having 6 sub-pulses 201 per pulse burst 200 and a pulse burst energy of 420 µJ. Line 16 shows the break resistance of a contour of defects that are spaced apart by 4 µm that are formed by pulse bursts 200 having 8 sub-pulses 201 per pulse burst 200 and a pulse burst energy in a range of 460 µJ to 493 µJ. In addition, line 18 shows the break resistance of a contour with defects spaced apart in a range of 8 µm to 10 µm that are formed by pulse bursts 200 having 20 sub-pulses 201 per pulse burst 200 and a pulse burst energy in a range of 530 µJ to 585 µJ. Lines 12-18 show that the burst duration $T_{bd}$ of a pulse burst 200 has a stronger effect on the break resistance of the contour 170 than the total number of sub-pulses 201 in the pulse burst 200. Indeed, as shown by graph 10, for burst durations $T_{bd}$ of greater than 150 ns, break resistances of less than 15 MPa are achieved, for burst durations $T_{bd}$ of greater than 300 ns, break resistances of less than 12 MPa are achieved, and for burst durations $T_{bd}$ of greater than 400 ns, break resistances of less than 10 MPa are achieved.

Figure 4B:
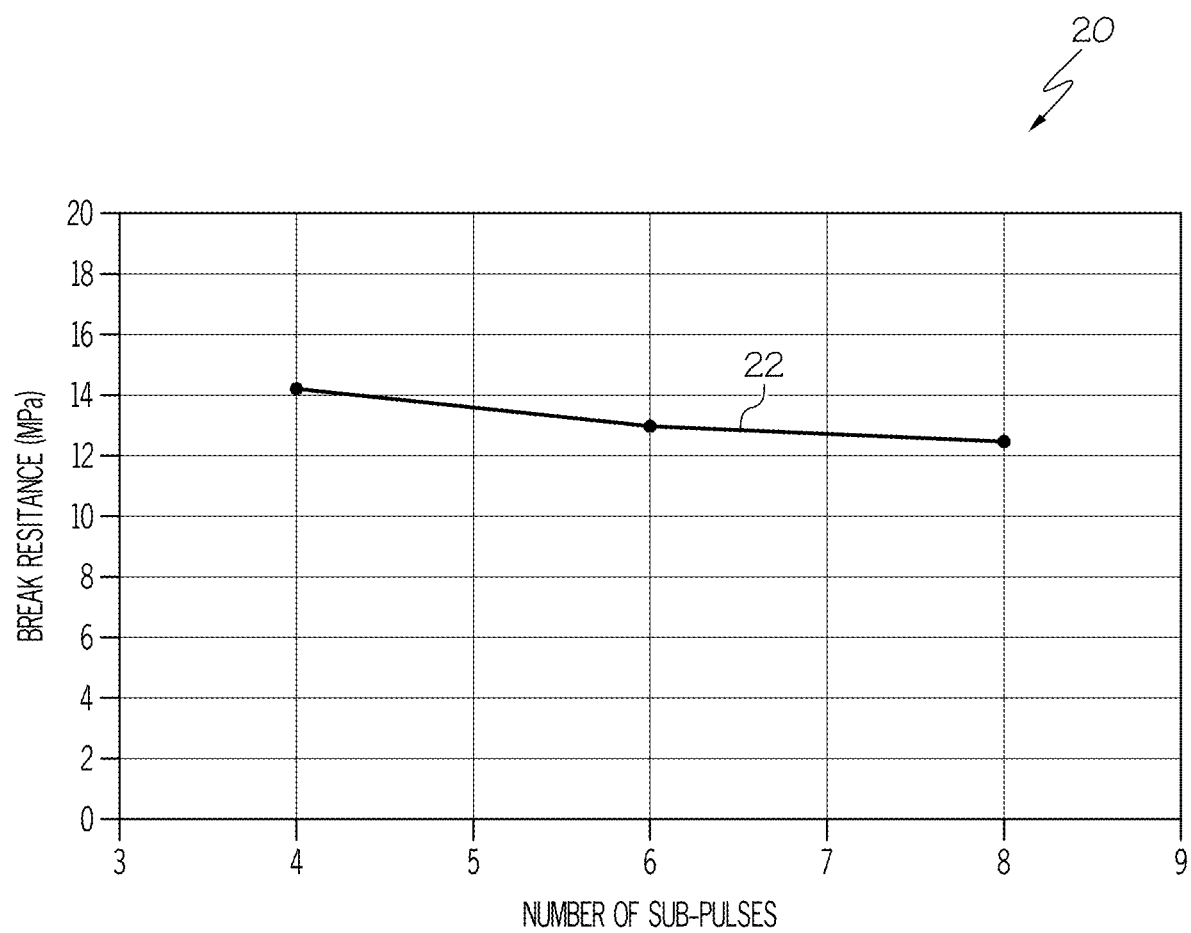
FIG. 4B graphically depicts break resistance of example contours of defects as a function of the number of sub-pulses of a pulse burst used to form the example contours of defects, according to one or more embodiments shown and described herein.

Referring now to FIG. 4B, line 22 of graph 20 depicts the experimentally measured break resistance of an example contour of defects (i.e., an example linear contour of defects) a function of the number of sub-pulses 201 in a pulse burst 200, while holding the sub-pulse period $T_p$ constant (at 36 ns) and holding the pulse burst energy within the pulse burst 200 constant (at 460 µJ). Thus, as the number of sub-pulses 201 increases, the burst duration $T_{bd}$ of the pulse burst 200 increases, but the energy per sub-pulse 201 decreases. As shown by the flatness of line 22, the break resistance reduction anticipated from the increase in burst duration $T_{bd}$ of the pulse burst 200 is mitigated by the decrease in the energy per sub-pulse 201 of the pulse burst 200. Thus, to minimize break resistance the increase of burst duration $T_{bd}$ of the pulse burst 200 may be coupled with an increase in the sub-pulse period $T_p$. Note that the contours whose break resistance is graphically depicted in graph 20 were formed in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 20 is formed in the widthwise direction of the transparent workpiece 160 and is thus a 44 mm long contour.

Figure 5:
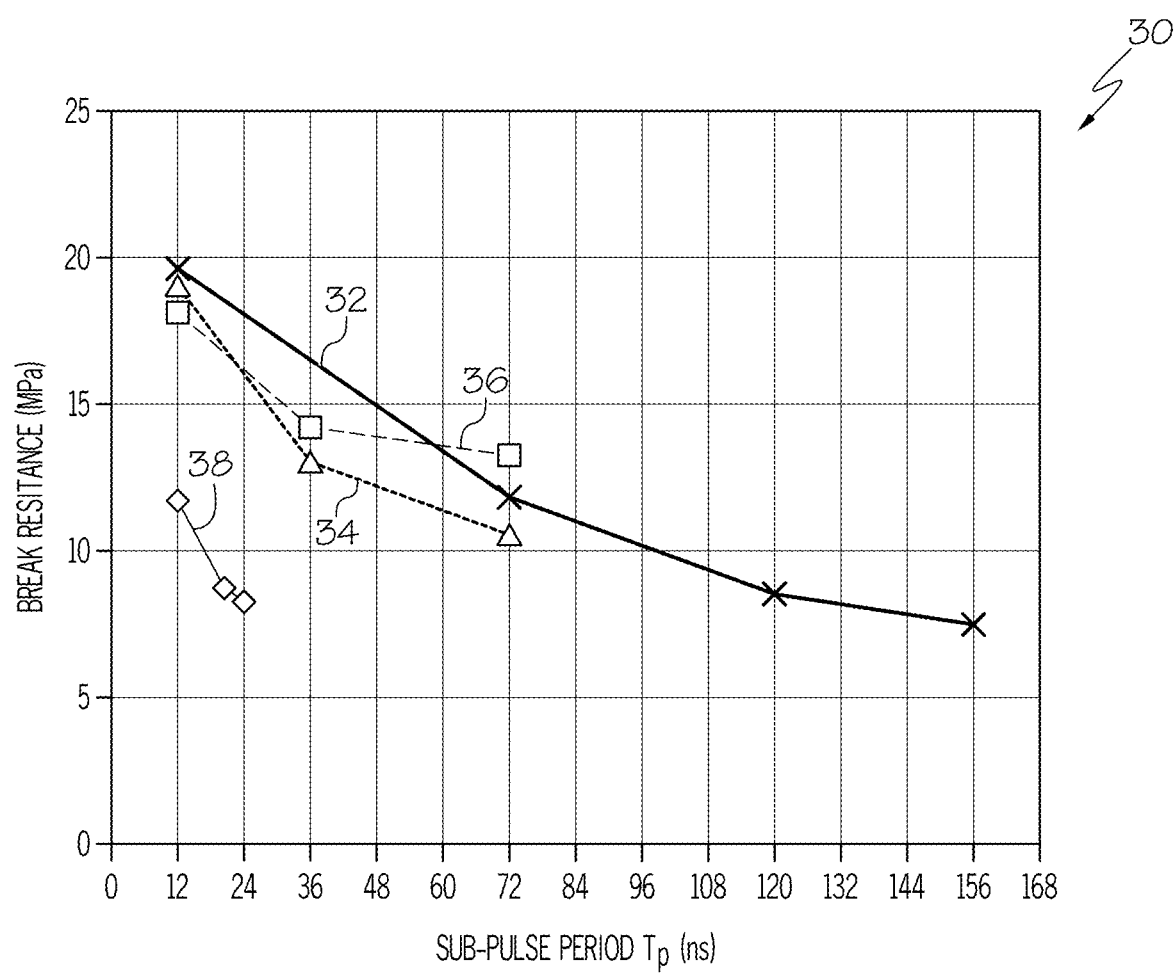
FIG. 5 graphically depicts break resistance of example contours of defects as a function of the sub-pulse period of a pulse burst used to form the example contours of defects, according to one or more embodiments shown and described herein.

Referring now to FIG. 5, graph 30 depicts the experimentally measured break resistance of example contour of defects (i.e., an example linear contour of defects) as a function of sub-pulse period $T_p$ of a pulse bursts having different numbers of sub-pulses 201 per pulse burst 200. The contours whose break resistance is graphically depicted in graph 30 were formed in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 30 is formed in the widthwise direction of the transparent workpiece 160 and is thus a 44 mm long contour. Line 32 shows the break resistance of a contour of defects that are spaced apart by 8 µm that are formed by pulse bursts 200 having 4 sub-pulses 201 per pulse burst 200 and a pulse burst energy in a range of 503 µJ to 510 µJ. Line 34 shows the break resistance of a contour of defects that are spaced apart by 7 µm that are formed by pulse bursts 200 having 6 sub-pulses 201 per pulse burst 200 and a pulse burst energy of 420 µJ. Line 36 shows the break resistance of a contour of defects that are spaced apart by 4 µm that are formed by pulse bursts 200 having 8 sub-pulses 201 per pulse burst 200 and a pulse burst energy in a range of 460 µJ to 493 µJ. In addition, line 38 shows the break resistance of a contour with defects spaced apart in a range of 8 µm to 10 µm that are formed by pulse bursts 200 having 20 sub-pulses 201 per pulse burst 200 and a pulse burst energy in a range of 530 µJ to 585 µJ.

Lines 32-38 of graph 30 depict that, for a fixed number of sub-pulses 201 per pulse burst 200, increasing the sub-pulse period $T_p$ causes a monotonic drop in the break resistance. Furthermore, line 38 shows that, when there are 20 sub-pulses 201 per pulse burst 200, a sub-pulse period $T_p$ of 24 ns creates the lowest break resistance. While this result may be interpreted as an indication that, when the number of sub-pulses 200 per pulse burst 200 is increased (e.g. increased to 20 sub-pulses 201), a reduced break resistance may be achieved by increasing the sub-pulse period $T_p$. However, it should be understood that pulse bursts 200 comprising 20 sub-pulses 201 with a sub-pulse period $T_p$ of 20 ns and 24 ns, respectively, comprise burst durations $T_{bd}$ of 380 ns and 456 ns, respectively, and this burst duration $T_{bd}$ is believed to be the primary factor accounting for the low break resistance shown by line 38. Accordingly, graph 30 of FIG. 5 shows that if the number of sub-pulses 201 per pulse burst 200 is fixed, a longer sub-pulse period $T_p$ is beneficial because this increase the burst duration $T_{bd}$, thereby reducing break resistance. However, if the sub-pulse period $T_p$ is fixed, it is beneficial to increase the number sub-pulses 201 in the pulse burst 200 to increase the burst duration $T_{bd}$ of the pulse burst 200.

Figure 6:
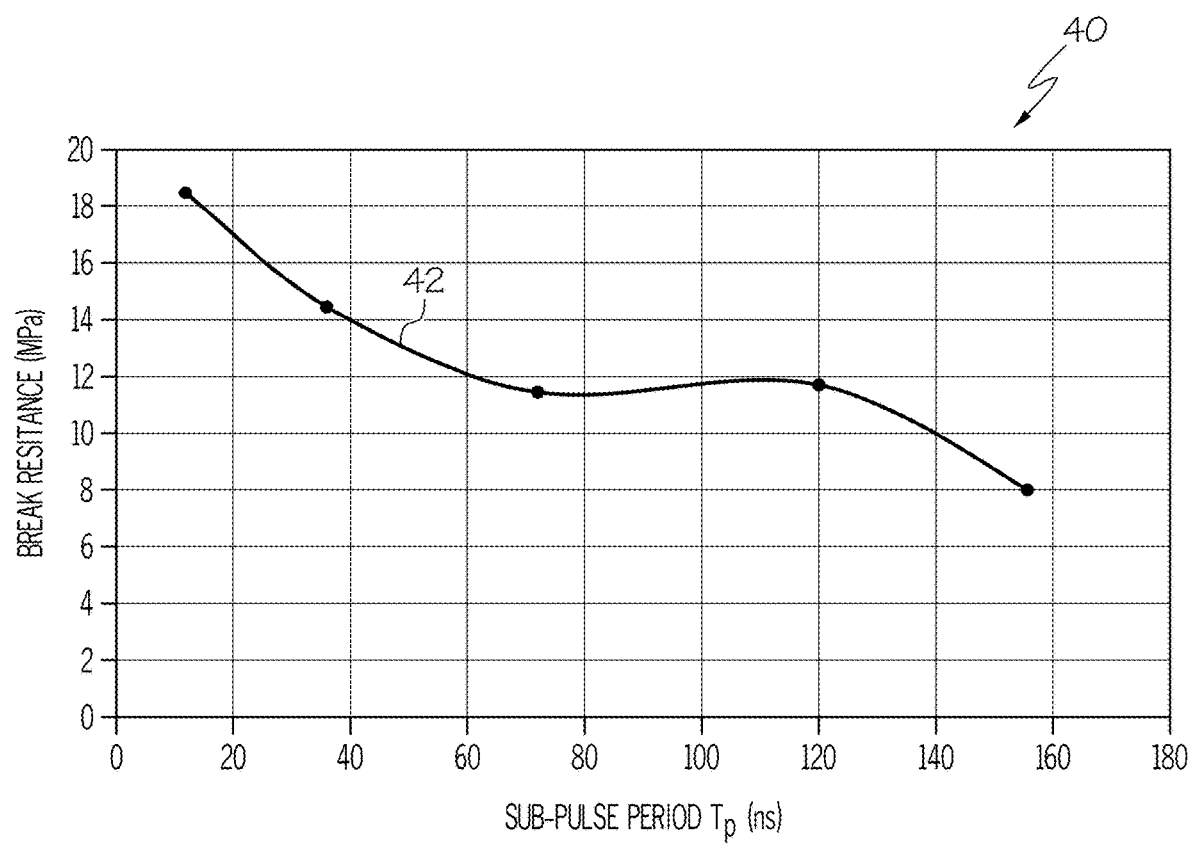
FIG. 6 graphically depicts break resistance of example contours of defects as a function of the sub-pulse period of a pulse burst used to form the example contours of defects, according to one or more embodiments shown and described herein.

Moreover, in some embodiments, it may be particularly advantageous to both increase the burst duration $T_{bd}$ and to increase the sub-pulse period $T_p$. For example, in some embodiments, each pulse burst may comprise a burst duration $T_{bd}$ of 400 ns or greater and a sub-pulse period $T_p$ is 10 ns or greater. For example, FIG. 6 depicts a graph 40 that shows the break resistance of an example contour, formed in a 0.7 mm thick transparent workpiece 160 that is not chemically strengthened by ion exchange (i.e., is unstressed), as a function of sub-pulse period $T_p$ in a pulse burst 200 having 4 sub-pulses 201 and a pulse burst energy in a range of 470 µJ to 510 µJ. Further, the break resistances graphically depicted in graph 40 were measured LIT by the four-point bending apparatus 150 (FIG. 2C). Line 42 shows that merely increasing the sub-pulse period $T_p$ (thereby increasing burst duration $T_{bd}$) of the pulse burst 200 reduces the break resistance of the contour 170.

Figure 7A:
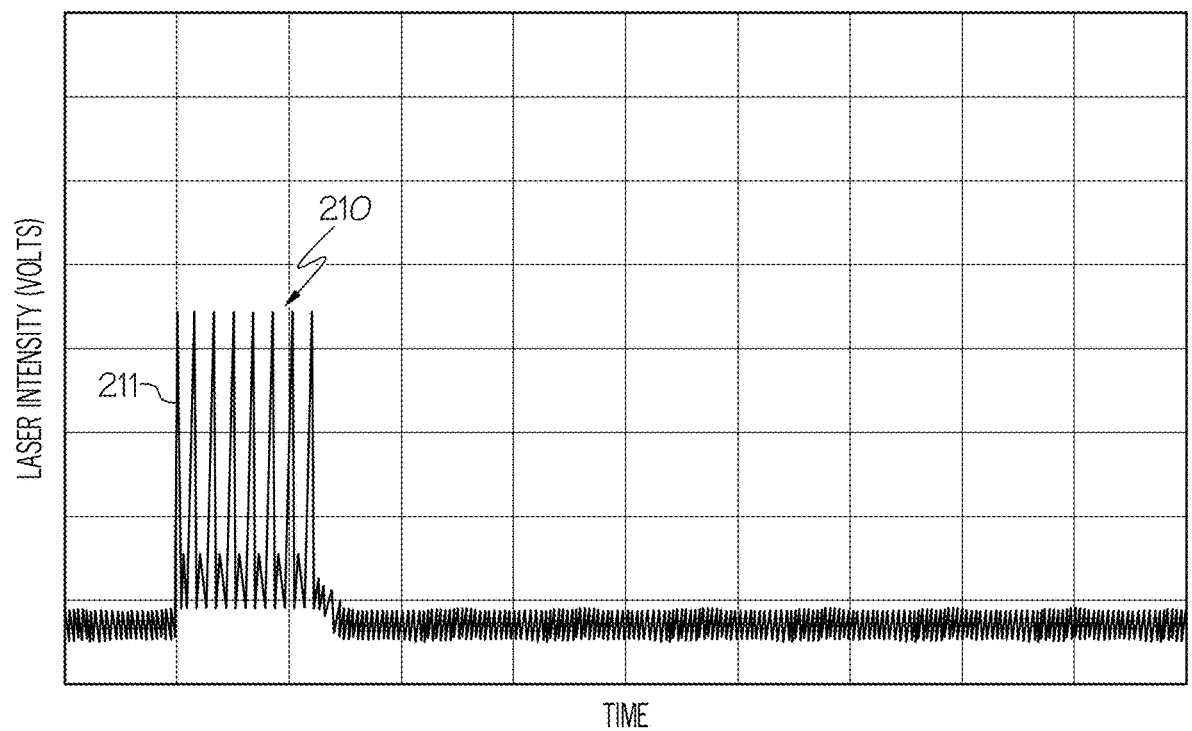
FIG. 7A graphically depicts relative intensity of laser pulses vs. time within another exemplary pulse burst, according to one or more embodiments described herein.
Figure 7B:
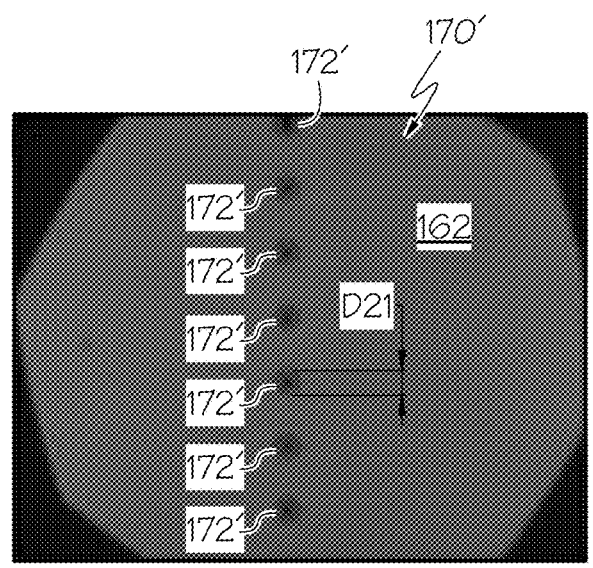
FIG. 7B is a grayscale image of an example contour of defects formed using the pulse burst of FIG. 7A, according to one or more embodiments described herein.
Figure 7C:
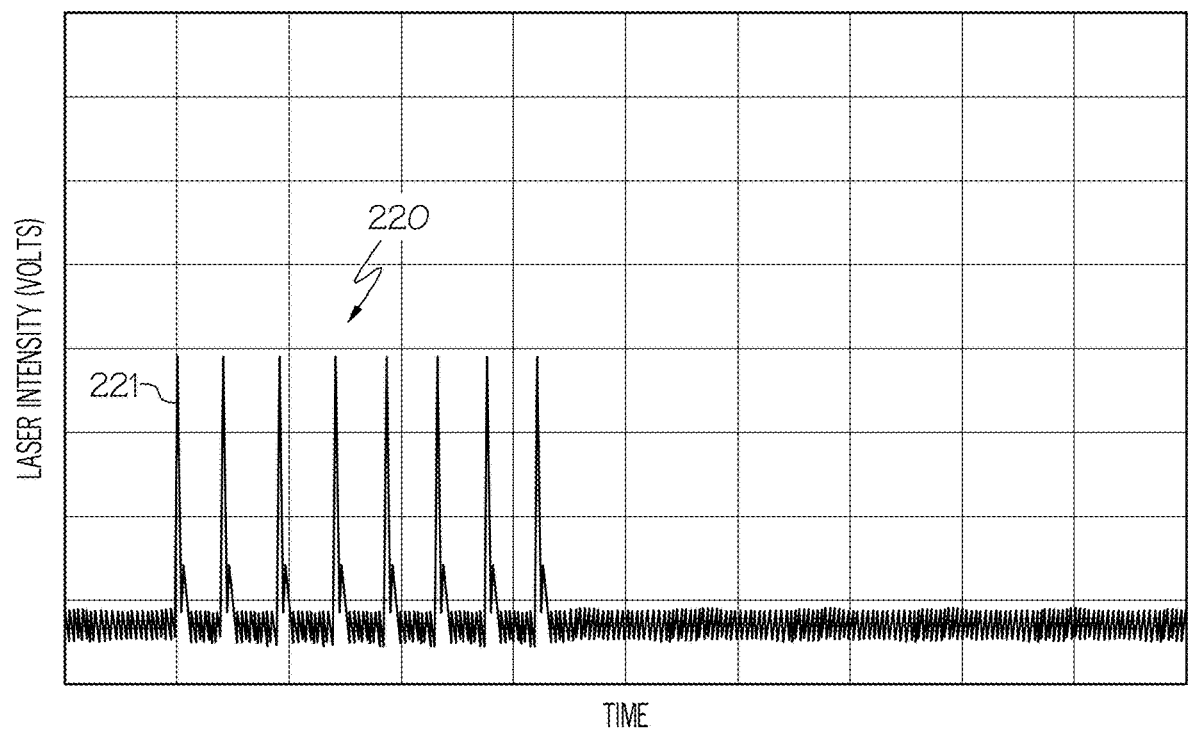
FIG. 7C graphically depicts relative intensity of laser pulses vs. time within another exemplary pulse burst, according to one or more embodiments described herein.
Figure 7D:
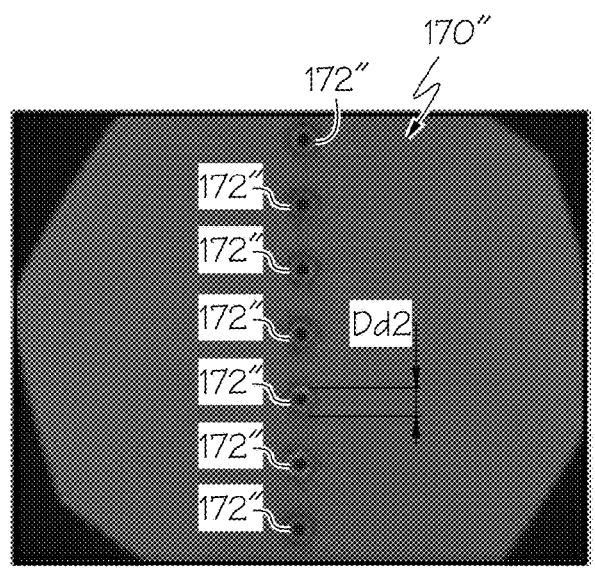
FIG. 7D is a grayscale image of an example contour of defects formed using the pulse burst of FIG. 7C, according to one or more embodiments described herein.
Figure 7E:
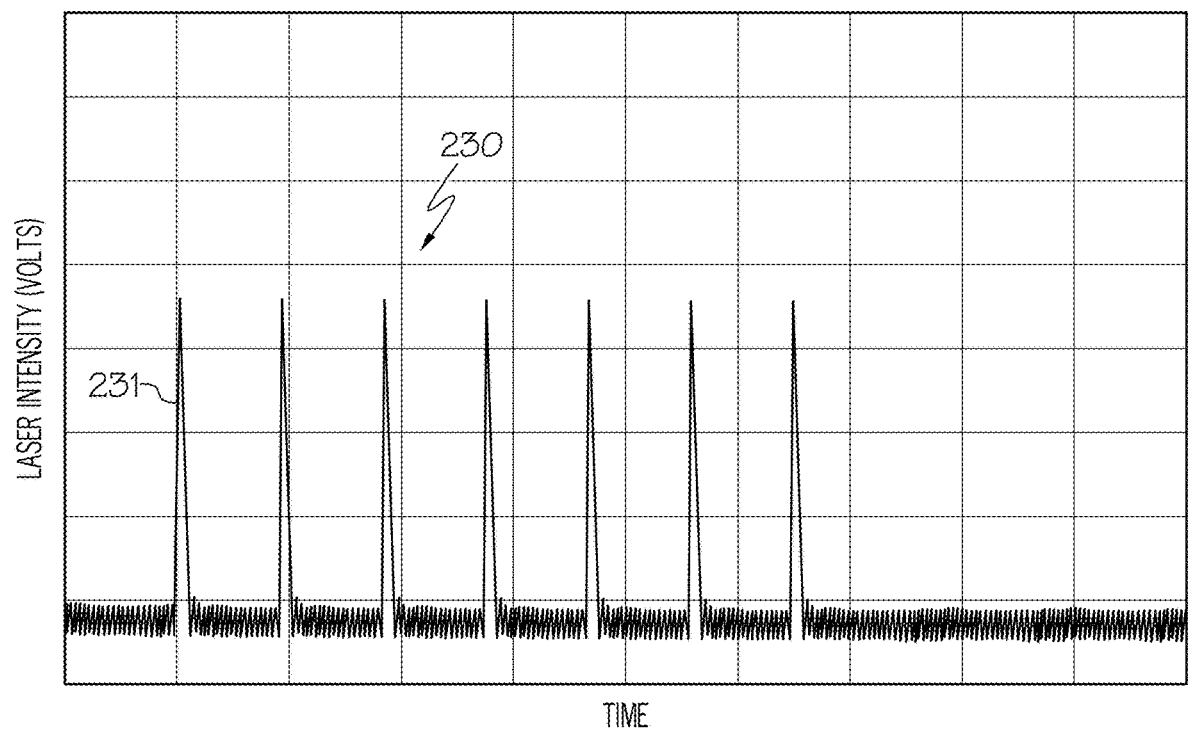
FIG. 7E graphically depicts relative intensity of laser pulses vs. time within another exemplary pulse burst, according to one or more embodiments described herein.

Referring now to FIGS. 7A-7F, increasing both the burst duration $T_{bd}$ of the pulse burst and the sub-pulse period $T_p$ increases the diameter (or maximum cross sectional dimension) of each defect 172 at the first surface 162 of the transparent workpiece 160. Without intending to be limited by theory, this increase in the diameter (or maximum cross sectional dimension) of each defect 172 at the first surface 162 of the transparent workpiece 160 reduces the break resistance of the contour 170. FIGS. 7A, 7C, and 7E each graphically depict example pulse bursts and FIGS. 7B, 7D, and 7F each depict example contours of defects formed using the pulse bursts of FIGS. 7A, 7C, and 7E, respectively. FIG. 7A depicts an example pulse burst 210 having eight sub-pulses 211, FIG. 7C depicts an example pulse burst 220 having eight sub-pulses 221, and FIG. 7E depicts an example pulse burst 230 having seven sub-pulses 231.

Figure 7F:
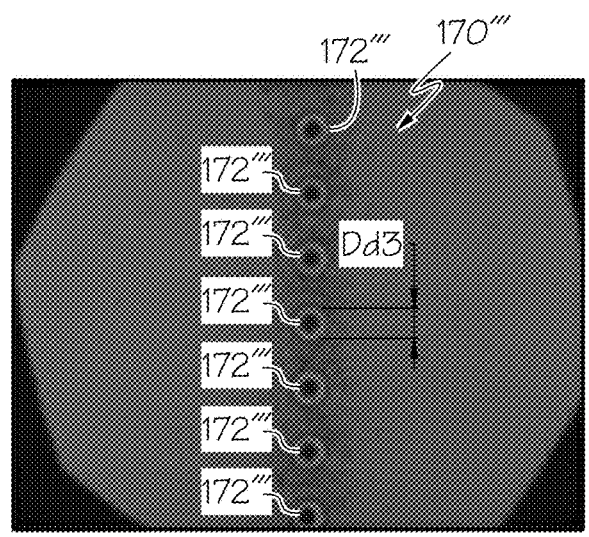
FIG. 7F is a grayscale image of an example contour of defects formed using the pulse burst of FIG. 7E, according to one or more embodiments described herein.

FIG. 7B depicts an example contour 170' having example defects 172' formed using the example pulse burst 210 of FIG. 7A. Each defect 172' is formed by a single burst of 8 sub-pulses. Each defect 172' of FIG. 7B comprises a first diameter $D_{d1}$ at the first surface 162. FIG. 7D depicts an example contour 170" having example defects 172" formed using the example pulse burst 220 of FIG. 7C. Each defect 172" comprises a second diameter $D_{d2}$ at the first surface 162. FIG. 7F depicts an example contour 170''' having example defects 172''' each comprising a third diameter $D_{d3}$ formed using the example pulse burst 230 of FIG. 7E. The first diameter $D_{d1}$ is smaller than both the second diameter $D_{d2}$ and the third diameter $D_{d3}$ because the first diameter Dai is formed with the pulse burst 210 (FIG. 7A), which has a smaller burst duration $T_{bd}$ and a smaller sub-pulse period $T_p$ than both the pulse burst 220 (FIG. 7C) and the pulse burst 230 (FIG. 7E). The second diameter $D_{d2}$ is larger than the first diameter $D_{d1}$ and smaller than the third diameter $D_{d3}$ because the second diameter $D_{d2}$ is formed with the pulse burst 220 (FIG. 7C), which has a burst duration $T_{bd}$ and a sub-pulse period $T_p$ that are each larger than the pulse burst 210 (FIG. 7A) and smaller than the pulse burst 230 (FIG. 7E). Further, the third diameter $D_{d3}$ is larger than both the first diameter $D_{d1}$ and the second diameter $D_{d2}$ because the third diameter $D_{d3}$ is formed with the pulse burst 230 (FIG. 7E), which has a larger burst duration $T_{bd}$ and a larger sub-pulse period $T_p$ than both the pulse burst 210 (FIG. 7A) and the pulse burst 220 (FIG. 7C).

Figure 8:
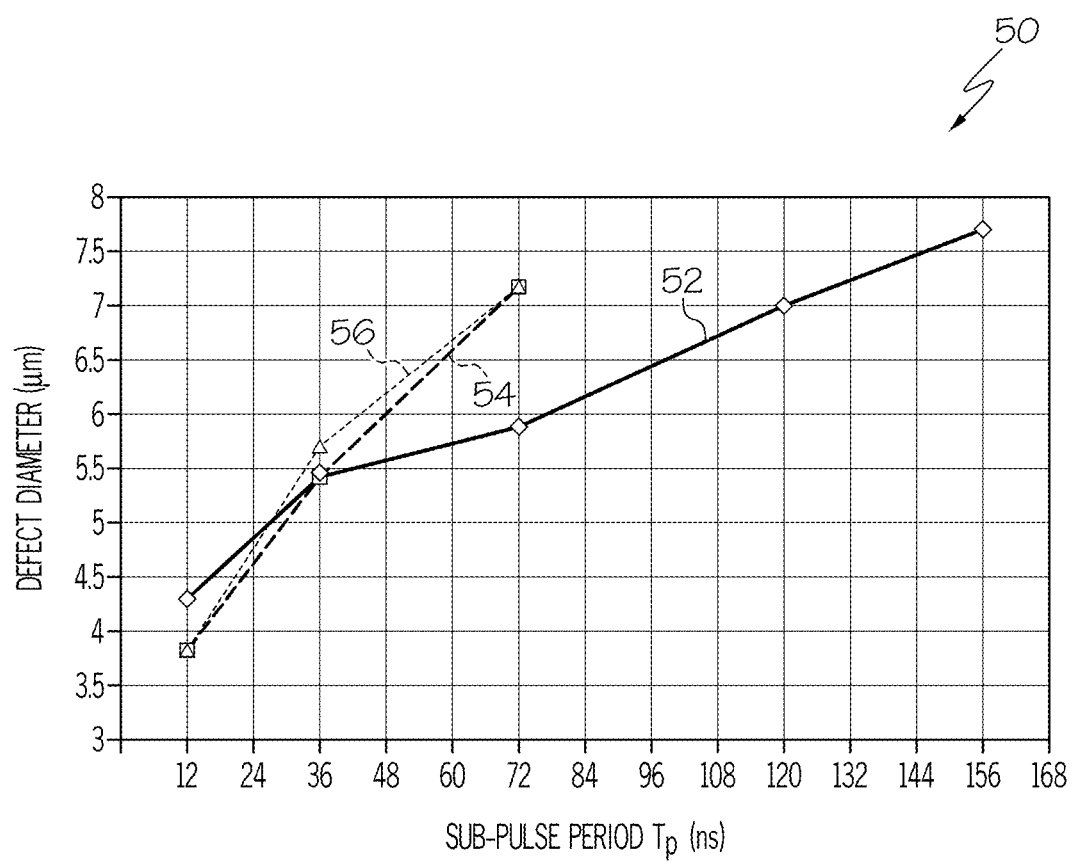
FIG. 8 graphically depicts defect diameter of an example defect as a function of the sub-pulse period of a pulse burst used to form the example defect, according to one or more embodiments shown and described herein.

Referring now to FIG. 8, a graph 50 depicts the diameter of defects at the first surface of an example transparent workpiece, where the defects are formed using different pulse bursts represented by lines 52, 54, and 56, as a function of sub-pulse period $T_p$. The defects whose diameter is graphically depicted in graph 50 were formed in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 50 is formed in the widthwise direction of the transparent workpiece 160 and is thus a 44 mm long contour. Line 52 shows the defect diameter of a defect formed by pulse bursts 200 having 4 sub-pulses 201 per pulse burst 200, line 54 shows the defect diameter of a defect formed by pulse bursts 200 having 6 sub-pulses 201 per pulse burst 200, and line 56 shows the defect diameter of a defect formed by pulse bursts 200 having 7 sub-pulses 201 per pulse burst 200. As shown in by graph 50, there is a strong monotonic increase in the diameter of defects 172 formed with a pulse burst 200 as the sub-pulse period $T_p$ of the pulse burst is increased.

As shown by FIG. 8, embodiments of the transparent workpiece 160 are contemplated that include the plurality of defects 172 forming a contour 170, such as a linear contour 170, where each of the plurality of defects 172 comprises a defect diameter of 7 μm or greater, such as 8 μm or greater. Indeed, such defects 172 may be formed by using pulse bursts having an increased pulse period $T_p$ and an increased burst duration $T_{bd}$. These larger defect diameters form contours 170 with reduced break resistance and facilitate separation of the transparent workpiece along the contour 170 using minimal force, reducing damage formed along the resultant separated edge of an article formed from the transparent workpiece 160. It also should be noted that the defect diameter is approximately the same at both the first surface 162 and the second surface 164 of the transparent workpiece 160. While the region inside the body of the transparent workpiece 160 may have only modified material, at the first surface 162 and the second surface 164 of the transparent workpiece 160, the pulsed laser beam focal line 113 ejects material to make craters or regions of vaporized material that have the same approximate diameters at each surface. For example, if the defect diameter at the first surface 162 of the transparent workpiece 160 is 7 μm, then then the defect diameter at the second surface 164 of the transparent workpiece 160 will be nearly 7 μm in diameter as well, such as between 6-8 μm in size.

Figure 9:
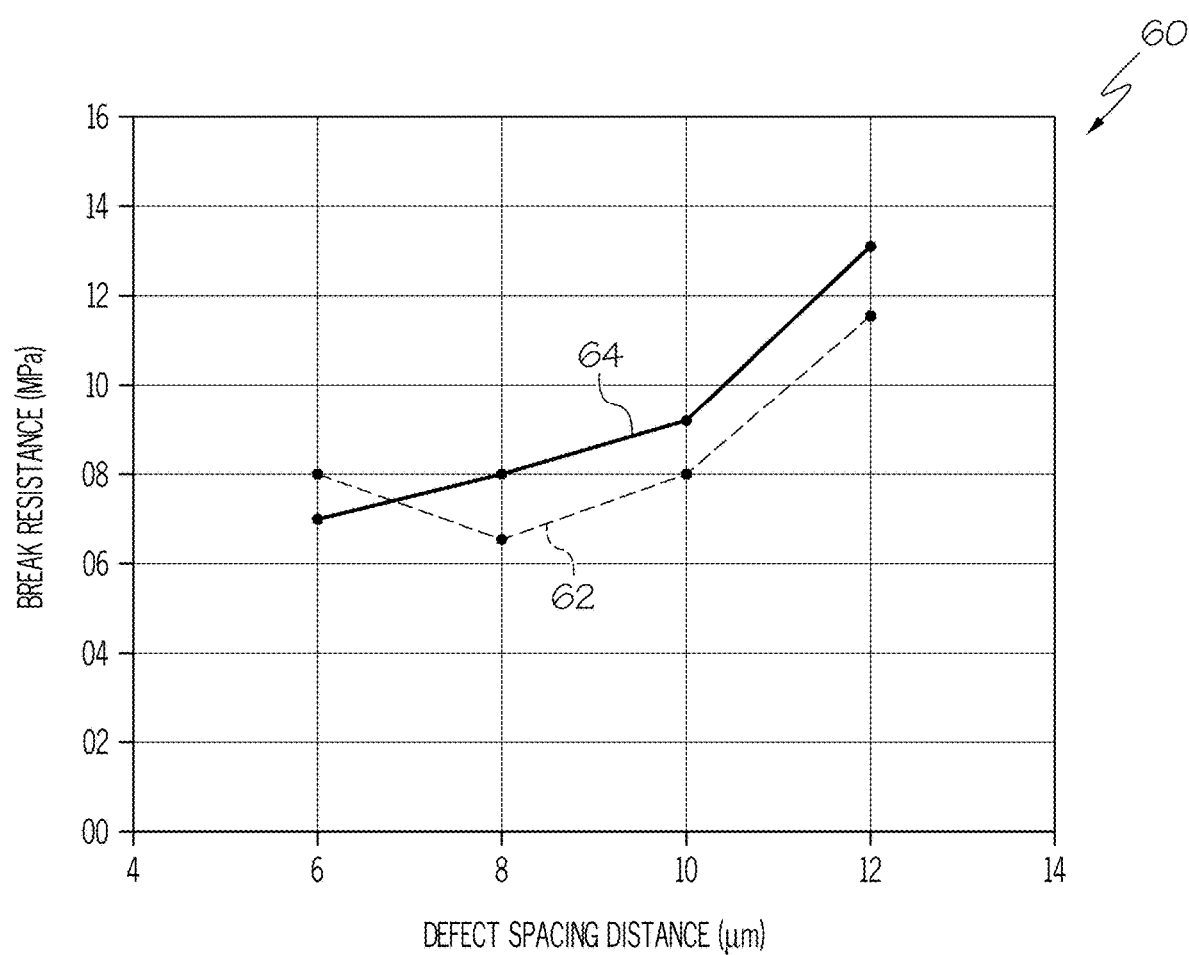
FIG. 9 graphically depicts break resistance of example contours of defects as a function of the defect spacing within the example contours of defects, according to one or more embodiments shown and described herein.

Furthermore, without intending to be limited by theory, the spacing between adjacent defects 172 of the contour 170 also affects the break resistance of the contour 170. The spacing between adjacent defects 172 can be controlled by synchronizing when a pulse burst is emitted by the pulsed beam source 110 and the speed of translation stages 190 moving at least one of the pulsed laser beam 112 and the transparent workpiece 160 relative to each other. For example, FIG. 9 includes a graph 60, which depicts break resistance of contours formed with pulse bursts having different sub-pulse periods $T_p$, as a function of the spacing between adjacent defects of the contours. The contours whose break resistance is graphically depicted in graph 60 were formed in a 0.5 mm thick transparent workpiece 160 of Corning EAGLE XG® glass having a 44 mm width and a 60 mm length that was not chemically strengthened by ion exchange (i.e., is unstressed). Further, the contours whose break resistance is graphically depicted in graph 30 is formed in the widthwise direction of the transparent workpiece 160 and is thus a 44 mm long contour. Further, the break resistances graphically depicted in graph 60 were measured LIC by the four-point bending apparatus 150 (FIG. 2C). For example, line 62 shows the break resistance of contours formed with a pulse burst having 4 sub-pulses per burst, a 120 ns sub-pulse period $T_p$, and a pulse burst energy of 550 μJ. Line 64 shows the break resistance of contours formed with a pulse burst having 4 sub-pulses per burst, a 156 ns sub-pulse period $T_p$, and a pulse burst energy of 550 μJ. The minima of each line (62 and 64) shows the optimal defect spacing (i.e., the defects spacing at which the contour has a minimum break resistance). Without intending to be limited by theory, the results depicted in FIG. 9 show that smaller defect spacing does not always correspond to lower break resistance. Indeed, FIG. 9 shows that as the sub-pulse period $T_p$ increases from 120 nm to 156 ns, the optimal defect spacing changes from about 6-8 μm to about 8-10 μm.

Figure 10:
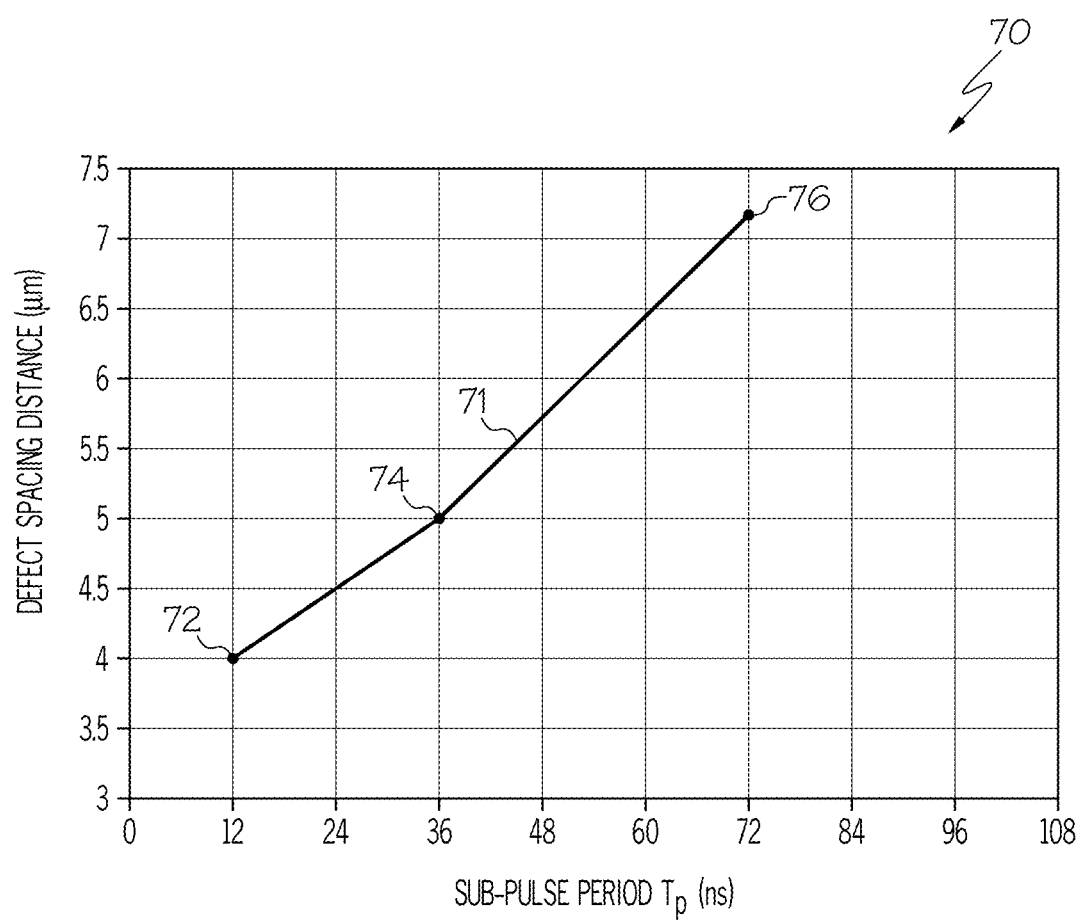
FIG. 10 graphically depicts the optimal defect spacing for three contours formed using pulse bursts with different sub-pulse periods, according to one or more embodiments shown and described herein.

Referring now to FIG. 10, a graph 70 depicts the optimal defect spacing (i.e., the defect spacing which achieves the lowest break resistance) for three contours (i.e., a linear contour of defects) formed using pulse bursts each having 4 sub-pulses with different sub-pulse periods $T_p$ and thus different total burst durations $T_{bd}$. The contours whose defect spacing is graphically depicted in graph 70 were formed with a pulse burst energy of 480 μJ in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 10 is formed in the widthwise direction of the transparent workpiece 160 and is thus a 44 mm long contour. Point 72 along line 71 of graph 70 corresponds to a contour formed with a pulse bursts having 4 sub-pulses with a 12 ns sub-pulse period $T_p$. The optimal defect spacing under these pulse conditions was determined to be 4 μm and the minimum break resistance under these pulse conditions was measured to be 16 MPa. Point 74 along line 71 of graph 70 corresponds to a contour formed with a pulse bursts having 4 sub-pulses with a 36 ns sub-pulse period $T_p$. The optimal defect spacing under these pulse conditions was determined to be 5 μm and the minimum break resistance under these pulse conditions was measured to be 13 MPa. Further, point 76 along line 71 of graph 70 corresponds to a contour formed with a pulse bursts having 4 sub-pulses with a sub-pulse period $T_p$ of 72 ns. The optimal defect spacing under these pulse conditions was determined to be 7.2 μm and the minimum break resistance under these pulse conditions was measured to be 11 MPa. Thus, increasing the sub-pulse period $T_p$ allows larger defect spacing, which facilitates faster laser processing.

Referring again to FIGS. 3A and 3B, in some embodiments, the energy distribution among the sub-pulses 201 of the pulse burst 200 are uniform or substantially uniform, as depicted in FIG. 3B. For example, in some embodiments, the energy of each sub-pulse may differ from the other sub-pulse by 10% or less, for example, 5% or less, 2% or less, or 1% or less. Further, as shown in FIG. 3A, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. It should be understood that other energy distributions within an individual pulse burst 200 are also possible, where the exact energy of each sub-pulse 201 can be tailored to effect different amounts of modification to the transparent workpiece 160.

In addition, in some embodiments, the break resistance of the contour 170 may vary directionally, for example, the contour 170 may have a different break resistance if it is made by creating defects 172 spaced apart in the X-direction versus creating defects 172 spaced apart in the Y-direction. This can occur because the rotational symmetry of the optical beam that interacts with the material is not perfect, and hence such a slightly asymmetric beam can create asymmetric defects that drive cracks more strongly in one direction versus another direction. However, it may be advantageous to minimize or control this directional variability. Without intending to be limited by theory, when the break resistance varies directionally, more stress may be needed to separate portions of the contour 170 extending along a surface of the transparent workpiece 160 in one direction (e.g., an X-direction) than needed to separate portions of the contour 170 extending in a different direction (e.g., a Y-direction). In this situation, separation of the transparent workpiece 160 along the contour 170 may be more difficult because crack propagation may occur along the portion of the contour 170 having lower break resistance but not along the portion of the contour 170 having higher break resistance and in some instances, catastrophic cracking may occur, for example, when the path of least resistance does not coincide with the contour 170. However, using pulse burst formed defects 172 that are directionally isotropic such that crack propagation is guided by the location of adjacent defects 172 (i.e., crack propagation follows the contour 170) and is minimally affected by any optical asymmetry in the pulsed laser beam 112, minimizes directionally biased crack propagation. Indeed, in the embodiments described herein, the contour 170 may comprise a directionally homogenous break resistance. As used herein, a "directionally homogenous break resistance" is a break resistance that does not vary by greater than 25% in any direction along the first surface 162 of the transparent workpiece 160 (e.g., along the X-Y plane).

In other embodiments, the break resistance is purposely non-uniform, for example, the break resistance may be lower in the direction of the contour line 165 to facilitate directionally biased crack propagation along the contour line 165, thereby requiring less stress to separate portions of the transparent workpiece 160 along the contour 170. Biasing of crack propagation along a preferred path through directional control of break resistance is accomplished with a laser having a non-axisymmetric cross section. Non-axisymmetric cross sections include elliptical cross sections and other cross sections that are elongated in one direction relative to other directions. Techniques for forming non-axisymmetric laser beams, laser beam focal lines from non-axisymmetric laser beams, defects with non-axisymmetric cross sections, and biasing of the direction of separation are described in US Patent Application Publication 20180093914A1, the disclosure of which is hereby incorporated herein.

One way to form a laser beam with a non-axisymmetric cross section is to pass the beam through a split quarter waveplate. Four cross sectional beam plots 301-304 of the pulsed laser beam focal line 113 formed using an optical assembly 100 that includes a split quarter waveplate is depicted in FIGS. 11A1-11A4. In particular, the cross sectional beam plots 301-304 of FIG. 11A each show the energy density of the pulsed laser beam focal line 113 within the transparent workpiece 160 and, in particular, show that the energy density of the pulsed laser beam focal line 113 is non-axisymmetric and has an elliptical shape having a long axis LA (i.e., $301_{LA}$-$304_{LA}$) and a short axis SA (i.e., $301_{SA}$-$304_{SA}$). Because the energy density of the pulsed laser beam focal line 113 is non-axisymmetric, rotation of the pulsed laser beam focal line 113 (i.e., rotation about the beam pathway 111) alters the orientation of the cross-section of the pulsed laser beam focal line 113.

Referring still to FIG. 11A1, a first cross sectional beam plot 301 of the pulsed laser beam focal line 113 includes a first long axis $301_{LA}$ oriented along the Y-axis and a first short axis $301_{SA}$ oriented along the X-axis and a second cross sectional beam plot 302 of the pulsed laser beam focal line 113 includes a second long axis $302_{LA}$ oriented along the X-axis and a second short axis $302_{SA}$ oriented along the Y-axis (FIG. 11A2). The first long axis $301_{LA}$ and the second long axis $302_{LA}$ are orthogonal and the first short axis $301_{SA}$ and the second short axis $302_{SA}$ are orthogonal. In other words, the pulsed laser beam focal line 113 is rotated 90° about the Z-axis from the first cross sectional beam plot 301 to the second cross sectional beam plot 302. As also depicted in FIG. 11A3, a third cross sectional beam plot 303 of the pulsed laser beam focal line 113 includes a third long axis $303_{LA}$ oriented 45° clockwise from the Y-axis and a third short axis $303_{SA}$ oriented 45° clockwise from the X-axis and a fourth cross sectional beam plot 304 of the pulsed laser beam focal line 113 includes a fourth long axis $304_{LA}$ oriented 45° counterclockwise from the X-axis and a fourth short axis $304_{SA}$ oriented 45° counterclockwise from the Y-axis (FIG. 11A4). The third long axis $303_{LA}$ and the fourth long axis $304_{LA}$ are orthogonal one another and the third short axis $303_{SA}$ and the fourth short axis $304_{SA}$ are orthogonal one another. In other words, the pulsed laser beam focal line 113 is rotated 90° about the Z-axis from the third cross sectional beam plot 303 to the fourth cross sectional beam plot 304.

Figure 11B:
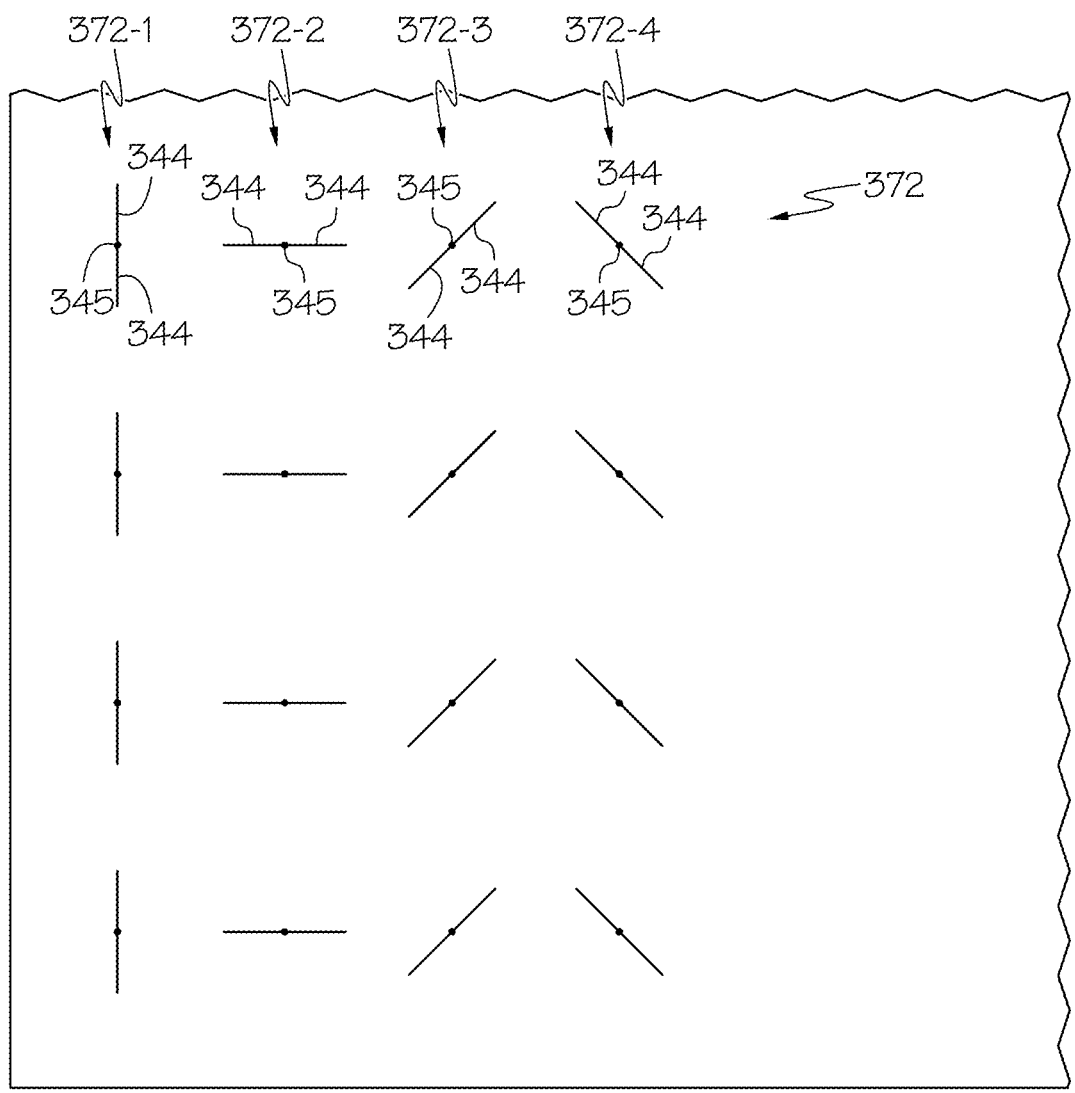
FIG. 11B schematically depicts example defects formed using the example pulsed laser beam focal line with the cross-sectional beam plots of FIGS. 11A1 through 11A4, according to one or more embodiments shown and described herein.

Referring also to FIG. 11B, the elliptical shape of the pulsed laser beam focal line 113, as depicted by the cross sectional beam plots 301-304 of FIGS. 11A1-11A4, helps form defects 372 that have a central defect region 345 formed at the intersection of the long axis LA and the short axis SA of the pulsed laser beam focal line 113 and one or more radial arms 344 are formed in the direction of the long axis LA of the pulsed laser beam focal line 113. For example, a first set of defects 372-1 are formed when the orientation of the pulsed laser beam focal line 113 corresponds with the first cross sectional beam plot 301, a second set of defects 372-2 are formed when the orientation of the pulsed laser beam focal line 113 corresponds with the second cross sectional beam plot 302, a third set of defects 372-3 are formed when the orientation of the pulsed laser beam focal line 113 corresponds with the third cross-sectional beam plot 303, and a fourth set of defects 372-4 are formed when the orientation of the pulsed laser beam focal line 113 corresponds with the forth cross-sectional beam plot 304. In operation, the pulsed laser beam focal line 113 oriented such that the long axis LA extends along the contour line 165 thereby forming defects 172 with radial arms 344 that extend along the contour line 165. By controlling the pulsed laser beam focal line 113 such that the direction of the radial arms of each defect 172 extends along the contour line 165, crack propagation may be better controlled.

Figure 12:
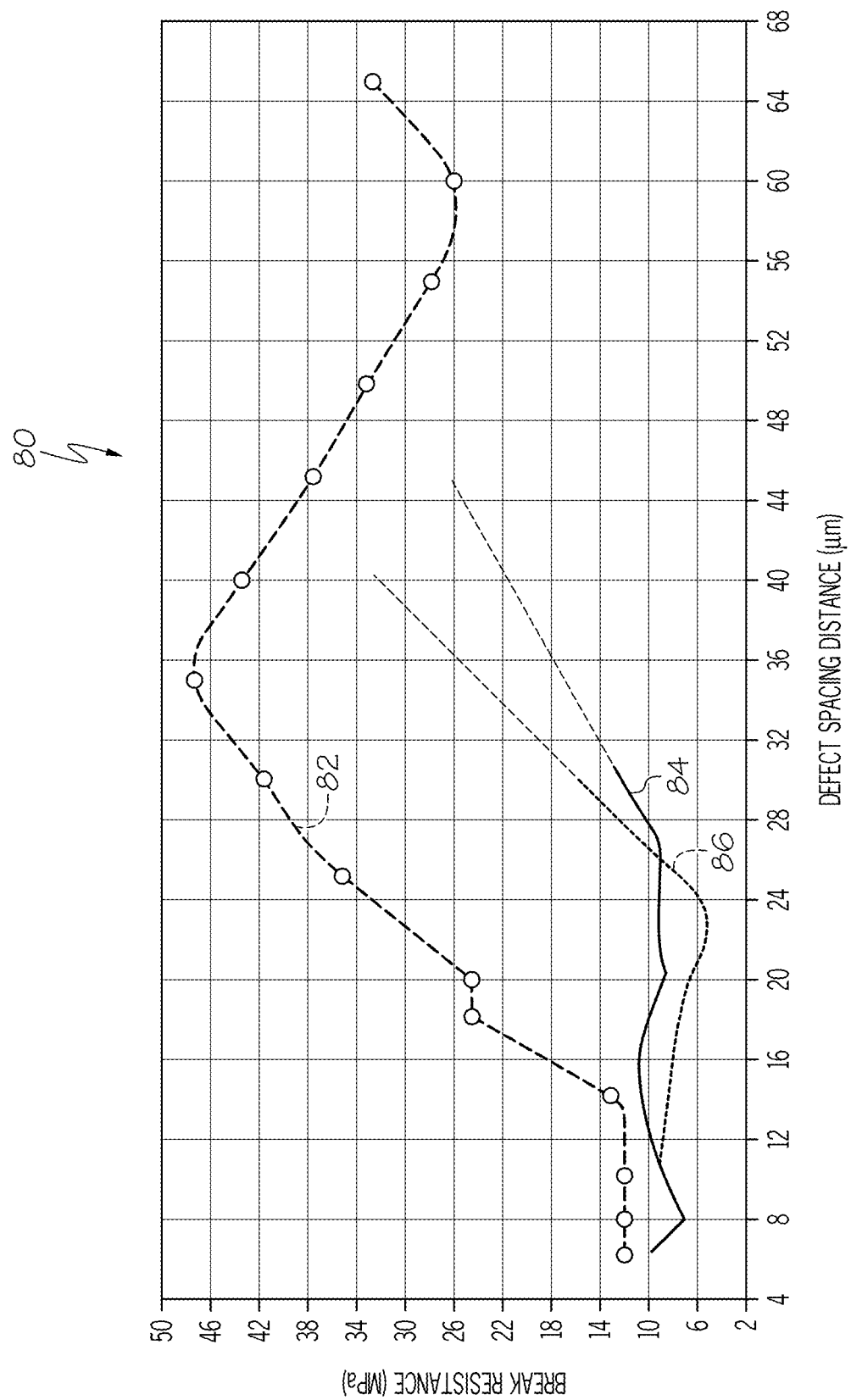
FIG. 12 graphically depicts break resistance of an example contour of defects formed as a function of the spacing between adjacent defects of the example contour of defects, according to one or more embodiments shown and described herein.

Referring now to FIG. 12, a graph 80 depicts break resistance of the contour 170 as a function of the spacing between adjacent non-axisymmetric defects 372 (i.e., the defects 372 of FIG. 11B), when using an optical system adapted to produce defects with a non-axisymmetric laser beam having a ratio of long axis to short axis of 2.3:1. The contours whose break resistance is graphically depicted in graph 80 were formed in a 0.7 mm thick transparent workpiece 160 of Corning Gorilla® Glass code 2318 having a 44 mm width and a 60 mm length that was not chemically strengthened by ion exchange (i.e., is unstressed). Further, the contours whose break resistance is graphically depicted in graph 10 is formed in the widthwise direction of the transparent workpiece 160 and is thus a 44 mm long contour. The non-axisymmetric defects 372 of the contours 170 measured and presented in graph 80 include radial arms aligned along the contour line 165 to facilitate controlled crack propagation. In particular, lines 82-86 of graph 80 show break resistance as a function of defect spacing distance for three example contours each formed by pulse bursts 200 having different sub-pulse periods $T_p$ and equal burst energies. The break resistances graphically depicted in graph 80 were measured LIC by the four-point bending apparatus 150 (FIG. 2C). Line 82 shows the break resistance of a contour of defects as a function of defect spacing distance that are formed by pulse bursts 200 having 4 sub-pulses 201 per pulse burst 200, a pulse burst energy of 475 µJ, and a sub-pulse period $T_p$ of 32 ns. Line 84 shows the break resistance of a contour of defects as a function of defect spacing distance that are formed by pulse bursts 200 having 4 sub-pulses 201 per pulse burst 200, a pulse burst energy of 475 µJ, and a sub-pulse period $T_p$ of 72 ns. Further, line 86 shows the break resistance of a contour of defects as a function of defect spacing distance that are formed by pulse bursts 200 having 4 sub-pulses 201 per pulse burst 200, a pulse burst energy of 475 µJ, and a sub sub-pulse period $T_p$ of 156 ns. As shown by line 86, the lowest break resistances are achieved with an increased sub-pulse period $T_p$ (and an increased burst duration $T_{bd}$), achieving a break resistance of about 3 MPa for non-axisymmetric defects 372 spaced apart by about 22 µm. Indeed, graph 80 shows that break resistances may be minimized by combining increases in sub-pulse period $T_p$ and an increased burst duration $T_{bd}$, with non-axisymmetric defects 372 with radial arms 344 aligned with the contour line 165.

Referring again to FIGS. 2A-3B, in some embodiments, the optical assembly 100 may further comprise a nonlinear optical crystal positioned between the pulsed beam source 110 and the transparent workpiece 160 to alter the pulsed laser beam 112 and generate higher harmonics and shorter wavelengths. In operation, the nonlinear optical crystal transform a longer wavelength λ (such as 1064 nm or 1030 nm) to a shorter wavelength $λ_o$ (such as 532 nm or lower), by the generation of second harmonics, third harmonics, fourth harmonics, and so on. For example, 532 nm is the second harmonic of 1064 nm, 357 nm is the third harmonic of 1064 nm, and 266 nm is the fourth harmonic of 1064 nm. Shorter wavelengths, such as 532 nm, 357 nm, or even lower, have stronger absorption in glass (such as the glass of the transparent workpiece 160) than longer wavelengths. Without intending to be limited by theory, shorter wavelengths reduce the number of photons required for the multi-photon absorption induced by the pulsed laser beam focal line 113 to exceed the bandgap of the material of the laser beam focal lines 113, since single photons have more energy at shorter wavelengths.

When generating higher order harmonics, increasing the intensity of the pulse burst 200 of the pulsed laser beam 112 may maximize conversion efficiency, because conversion efficiency scales with optical intensity squared. Furthermore, pulse burst energy is conserved within a pulse burst 200 such that using fewer sub-pulses 201 within an individual pulse burst 200 increases the energy of each sub-pulse 201. Indeed, reducing the number of sub-pulses 201 in a pulse burst 200 while increasing the sub-pulse period $T_p$ increases conversion efficiency and increases the energy of each sub-pulse 201. For example, for a constant pulse burst energy, a 2-pulse burst or 4-pulse burst would convert more efficiently from the infrared wavelength region to the green wavelength region than a 10-pulse burst or 20-pulse burst. This allows the pulsed laser beam 112 to be converted into higher order harmonics (i.e., lower wavelengths) more efficiently, which, because shorter wavelengths reduce the number of photons required to induce multi-photon absorption, facilitates faster processing speeds and facilities the formation of contours 170 of defects 172 in thicker transparent workpieces 160. Hence, if use of a harmonic wavelength is desired for cutting with low break resistance, it may be advantageous to use a small number of pulses per burst with for a given total burst duration (large separation between sub-pulses) as opposed to a larger number of pulses per burst (small separation between sub-pulses) with the same total burst duration. Moreover, while not intending to be limited by theory, using sub-pulses energies of equal energy may improve the conversion efficiency when compared to sub-pulse energies having an exponential decay in energy.

One reason for employing shorter wavelengths (e.g. 532 nm, 355 nm, or 515 nm, or 343 nm) to form defects 172 is that shorter wavelengths allow use of optics with lower numerical aperture in non-diffracting beam processing. Shorter wavelengths are advantageous in some applications because the focused spot diameter of a laser beam scales as $d_{spot} \sim λ/NA$, where $d_{spot}$ is the focused spot diameter, λ is the wavelength of the light, and NA is the numerical aperture of the focusing optics. As described in U.S. patent application Ser. No. 16/430,985, the disclosure of which is hereby incorporated herein by reference, use of a lower numerical aperture optical system with non-diffracting beams is beneficial when it is desired to place contours 170 of defects 172 close to non-transparent features on substrates (e.g., transparent workpieces 160), such as metal masks or black matrix printing. It is often desirable to make contours 170 of defects 172 in close proximity to such features in order to pack parts or devices closer together, more efficiently using a substrate (e.g., a transparent workpiece 160).

Without intending to be limited by theory, the lower the numerical aperture of the laser beam, the closer the defects 172 can be positioned to the non-transparent features without shadowing effects, which inhibit the formation of the defects 172 through the full depth of the transparent workpiece 160, and without exposing adjacent non-transparent features to too much energy, which can ablate or melt such features. With the longer fundamental wavelengths, such as 1064 nm or 1030 nm, often employed in non-diffracting beam systems, typical NAs used to generate defects in transparent workpieces 160 are from 0.2 to 0.45, such as 0.27, 0.35, or 0.4. However, with the shorter harmonic wavelengths formed from the longer fundamental wavelengths, such as 532 nm, NAs can be reduced to less than 0.2, such as 0.15, or 0.1, or even 0.07, and still retain a tight enough spot size and sufficiently high intensity to modify the transparent workpiece 160 through non-linear optical processes as described above. However, the harmonic generating process must still produce sub-pulses with sufficient energy, which is enabled by keeping the number of sub-pulses in the pulse burst small (e.g., from 2 to 4 sub-pulses per pulse burst) so that each sub-pulse has high energy and converts from the fundamental wavelength to the harmonic wavelength efficiently.

In view of the foregoing description, it should be understood that laser processing transparent workpieces may be enhanced by using pulsed laser beams produced in pulse bursts having two or more sub-pulses per pulse burst with an increased burst duration, an increased sub-pulse period, or both. In particular, using pulse bursts having the properties described herein facilitates the formation of contours of defects having a low break resistance, which minimizes damage in the resultant separated article(s) formed by separating the transparent workpiece along the contour, leading to high edge strength surfaces formed by separation along the contour.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for processing a transparent workpiece, the method comprising:
    directing a pulsed laser beam into the transparent workpiece, wherein:
        the pulsed laser beam comprises pulse bursts having 2 sub-pulses per pulse burst or more;
        each pulse burst of the pulsed laser beam comprises a burst duration $T_{bd}$ of 380 ns or greater; and
        the pulsed laser beam forms a pulsed laser beam focal line in the transparent workpiece, the pulsed laser beam focal line inducing absorption in the transparent workpiece, the induced absorption producing a defect in the transparent workpiece; and
        the pulsed laser beam focal line comprises:
            a wavelength $\lambda$;
            a spot size $w_o$; and
            a Rayleigh range $Z_R$ that is greater than $$F_D \frac{\pi w_o^2}{\lambda},$$

where $F_D$ is a dimensionless divergence factor comprising a value of 10 or greater; and
    translating at least one of the transparent workpiece and the pulsed laser beam relative to each other along an open contour line to form an open contour comprising a plurality of the defects in the transparent workpiece; and
    directing an infrared laser beam into the transparent workpiece along the open contour line to induce thermal stress in the transparent workpiece and thereby initiate separation along the open contour line, wherein:
        the open contour is linear and comprises a directionally homogenous break resistance that does not vary greater than 25% over any direction along a surface of the transparent workpiece, and
        wherein a diameter of each defect of the plurality of defects of the open contour and a spacing between adjacent defects of the open contour are increased with an increase in burst duration $T_{bd}$.

2. The method of claim 1, wherein each pulse burst of the pulsed laser beam comprises a sub-pulse period $T_p$ of 25 ns or greater.

3. The method of claim 1, wherein the spacing between adjacent defects of the plurality of the defects is from 10 μm to 30 μm.

4. The method of claim 1, wherein each pulse burst of the pulsed laser beam comprises from 2 sub-pulses to 5 sub-pulses.

5. The method of claim 1, wherein each pulse burst of the pulsed laser beam comprises a pulse burst energy of greater than 100 µJ.

6. The method of claim 1, wherein an energy of each sub-pulse of the pulse burst differs from the energy of other sub-pulses of the pulse burst by 10% or less.

7. The method of claim 1, wherein the break resistance is 20 MPa or less when measured with either a laser incidence side in tension (LIT) or a laser incidence side in compression (LIC).

8. The method of claim 1, wherein the pulsed laser beam traverses an aspheric optical element before irradiating the transparent workpiece.

9. The method of claim 1, wherein the dimensionless divergence factor $F_D$ comprises a value from 10 to 2000.

10. The method of claim 1, wherein a cross section of the pulsed laser beam focal line comprises a non-axisymmetric cross-sectional shape such that the defect comprises a non-axisymmetric cross-sectional shape.

11. The method of claim 1, wherein the wavelength $\lambda$ of the pulsed laser beam is less than 600 nm.

\* \* \* \* \*